United States Patent Office 3,433,781
Patented Mar. 18, 1969

3,433,781
2,4-DIHALOGENO-PYRIMIDINE-5-CARBAMYL-SUBSTITUTED REACTIVE DYES
Hans Ackermann, Riehen, Hermann Frei, Basel, and Hubert Meindl, Riehen, Switzerland, assignors to J. R. Geigy A.G., Basel, Switzerland
No Drawing. Filed Feb. 26, 1964, Ser. No. 347,349
Claims priority, application Switzerland, Mar. 1, 1963, 2,683/63
U.S. Cl. 260—146
Int. Cl. C09b 62/26, 62/24, 62/22
11 Claims The present invention concerns reactive dyestuffs, processes for the production thereof, their use for the dyeing of organic fibers, in particular textile fibers containing hydroxyl and amino groups, as well as industrial products, the fibers dyed with the aid of these dyestuffs.

Hitherto, reactive dyes, among them 2,4-dihalogeno-pyrimidine-6-carbamyl-substituted reactive dyes, permitted dyeing in the cold but required a certain drawing time.

It is an object of the invention to provide reactive dyes having a very high reactivity, in order to be able to dye satisfactorily within a shorter period and/or under even milder conditions than with the hitherto known reactive dyes, and to obtain at the same time dyeings primarily on cotton and the like cellulosic materials which are of comparable wet- and light-fastness and also have a good stability to acid hydrolysis.

The term "wet fastness" as used hereinbefore comprises wash fastness, fastness to transpiration and to water including sea-water.

This and other objects which will become apparent as the description of the invention proceeds, are attained and the above requirements made upon a reactive dye are met by the reactive dyestuffs according to the invention which fall under the formulas given under (a), (b) and (c) below:

(a) Dyestuffs of the formula

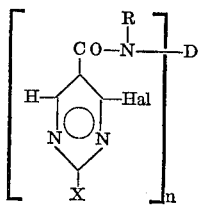

(IA)

wherein:
D represents a dyestuff-chromophoric radical of the class consisting of azo, anthraquinone or phthalocyanine dyestuff-chromophoric radicals, attached to the nitrogen atoms of the carbamyl group in the above formula through a carbon atom,
R represents hydrogen or a lower alkyl radical, the term "lower" as used in this specification and the appended claims in connection with an aliphatic radical meaning a radical of from 1 to 4 carbon atoms,
$n$ is an integer ranging from 1 to 2,
Hal represents a halogen atom of one of the atomic numbers 9, 17 and 35, i.e. fluorine, chlorine or bromine, and
X represents lower alkylthio radical, or a chlorine, fluorine or bromine atom of the same atom number as the halogen atom represented by Hal, (b) Dyestuffs of the formula

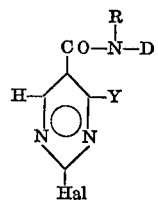

(IB)

wherein:
D, R, and Hal have the above-given meanings and Y represents —$SO_3H$, —$NH_2$, —$OR^3$, —$SR^3$, —$NHR^3$ or

wherein $R_3$ represents lower alkyl, ω-hydroxyl-alkyl, ω-lower alkoxy-alkyl, ω-sulfo-alkyl, "alkyl" in each of the latter three groups being of from 2 to 4 carbon atoms, ω-carboxy-lower alkyl, phenyl, sulfophenyl, carboxyphenyl, $R_4$ represents lower alkyl, ω-carboxy-lower alkyl, ω-hydroxy alkyl, ω-lower alkoxy-alkyl or ω-sulfoalkyl, "alkyl" in the last three groups being of from 2 to 4 carbon atoms;

(c) Dyestuffs of the formula

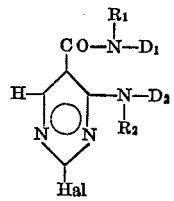

(IC)

wherein:
Each of $D_1$ and $D_2$ has the meaning given above for D,
Each of $R_1$ and $R_2$ has the meaning given above for R, and
Hal has the same meaning as given above.

Of the dyestuffs according to the invention, especially those falling under Formula IA in which X stands for halogen are distinguished, especially from the above-mentioned known 2,4-dihalogeno-pyrimidine-6-carbamyl-substituted reactive dyes by an unexpected high reactivity and yet, in spite of the latter, satisfactory stability, especially also at lower temperatures (10°–20° C.), the reactivity being about 30 to 40 times higher than that of the corresponding dyestuffs bearing the aforesaid isomeric fiber-reactive grouping.

However, it was also to be expected that any increase in reactivity would be accompanied by a correspondingly serious loss in fastness properties of the dyeings obtained with such dyes, and partciularly with a decrease in wet fastness properties which would render the resulting dyes worthless as cotton dyes.

We have now found that, surprisingly, the opposite is the case, and that the new dyestuffs according to the invention show, in spite of the much higher reactivity than the dyestuffs bearing the afore-mentioned isomeric groupings, unexpectedly, at least equally good or even superior wash fastness properties and fastness to acid hydrolysis of the resulting dyes.

The dyestuffs according to the invention and other reactive dyestuffs also substituted with one to two halogenated pyrimidine-5-carbamyl reactive groupings are produced by reacting an organic dyestuff of the formula

(I)

wherein:

D, R and n have the meanings given above with from 1 to 2 moles, per mole of the dyestuff of Formula I, of a compound introducing a radical of the formula

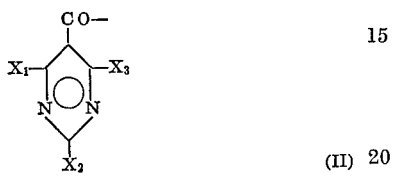
(II)

wherein:

Of $X_1$, $X_2$ and $X_3$, at least one is a radical which can be split off and the two others independently are each hydrogen or any monovalent substituent desired, to form a dyestuff of Formula III

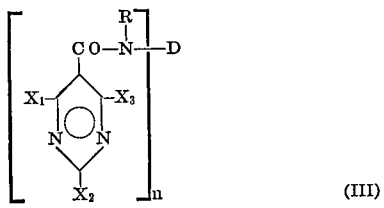
(III)

wherein:

D, R and $n$ have the meanings given in Formula I and $X_1$, $X_2$ and $X_3$ have those given in Formula II, or by producing a dyestuff of Formula III from components of the dyestuff of Formula I, of which at least one contains the radical of Formula II bound via an amino group of the formula

wherein R has the above-given meaning.

In Formulas I and III, D is in particular the radical of a technically easily accessible dyestuff, e.g. the radical of a mono-, dis- or poly azo dyestuff or a formazane dyestuff which may contain heavy metal, of an anthraquinone, a nitro or a phthalocyanine dyestuff.

When D is the radical of an azo dyestuff, it is, for example, the radical of a monoazo dyestuff either not containing or containing heavy metal of the benzene-azo-benzene, benzene-azo-naphthalene, benzene-azo-pyrazole, benzene-azo-acetoacetylarylide, naphthalene-azo-naphthalene and naphthalene-azo-pyrazole series, or it is the radical of a disazo dyestuff of the benzene-azo-benzene-azo-benzene, benzene - azo - naphthalene-azo-benzene, naphthalene-azo-benzene-azo-benzene or formazane series. When D is the radical of an anthraquinone dyestuff it is preferably a 1-amino-4-phenyl-aminoanthraquinone or 1-amino-4-diphenylaminoanthraquinone radical. If D is the radical of a phthalocyanine dyestuff it is preferably the radical of an in particular sulfonated phthalocyanine N-alkyl or N-aryl-sulfamide.

The dyestuffs mentioned can contain the substituents compatible with reactive dyestuffs. By such are meant: halogen of the atomic numbers 9, 17 and 35, i.e. fluorine, chlorine and bromine, lower alkyl groups having straight or branched chains such as the methyl, ethyl, propyl, isopropyl, n-butyl, tert. butyl and amyl group, cycloalkyl and lower alkyl cycloalkyl with from 5 to 6 ring carbon atoms such as the cylohexyl and the methylcyclohexyl group, mononuclear carbocyclic aryl-lower alkyl groups such as the benzyl or phenethyl group, ether groups, namely lower alkoxy such as the methoxy or ethoxy group, or the benzyloxy or phenoxy group, carboxylic and sulfonic acid groups, acylamino groups, particularly lower alkanoylamino groups, such as the acetylamino group, the benzoylamino group carbamyl and sulfamyl groups which are unsubstituted or substituted at the N atom by one to two lower alkyl, hydroxy-lower alkyl or lower alkoxy-lower alkyl, or not more than one phenyl or cyclohexyl group, further, the nitro, amino and hydroxyl group.

R represents, for example, the methyl or ethyl group; preferably, however, it is hydrogen.

Radicals which can be split off in the positions of $X_1$, $X_2$ or $X_3$ are the sulfonic acid group or hydrocarbon sulfonyl groups, especially lower alkyl-sulfonyl groups such as the methyl sulfonyl or ethyl sulfonyl group, also negatively ring-substituted aryl-oxy and especially phenoxy or thiophenoxy groups such as the 2,4-dinitrophenoxy group, or the 4-nitrophenyl-thio group, or the dithiocarbamyl group. Preferably, however, these radicals are halogen such as fluorine, bromine and, particularly, chlorine, since the corresponding compounds of Formula II are readily accessible.

Examples of monovalent substituents $X_1$, $X_2$ and $X_3$ are radicals which can be split off such as those of the type described in the previous paragraph, or hydrocarbon groups, particularly lower alkyl groups such as the methyl or ethyl group, ether groups, especially lower alkoxy groups such as the methoxy or ethoxy group, thioether radicals, in particular lower alkylthio groups such as the methylthio or ethylthio group, or amino groups derived from ammonia or from a primary or secondary lower alkyl-amine such as the amino, methylamino, ethylamino, N,N-diethylamino, N,N-dimethylamino or N-phenyl-substituted amino groups which are further unsubstituted or substituted by a lower alkyl group.

Reactive substituent groupings of Formula II are particularly distinguished by high reactivity which contain hydrogen as $X_1$ and halogen, especially chlorine as $X_2$ and $X_3$.

The organic dyestuffs of Formula I contain the

groups either in the dyestuff structure or at external substituents, in the latter case substituents such as the benzene ring of benzoylamino or phenylamino groups.

Examples of amino dyestuffs of Formula I which are especially useful in producing the reactive dyes according to the invention are aminoanthraquinones such as 1-amino-4-(m- or p-aminophenylamino) - anthraquinones and their sulfonic acid derivatives, aminophthalocyanines such as condensation products of phthalocyanine sulfonyl chloride and alkylene diamines or arylene diamines which may be sulfonated, as well as aminoazo dyestuffs. The latter must contain amino groups to be acylated in the coupling or in the diazo component.

Valuable dyestuffs according to the invention are produced from dyestuffs of the formula

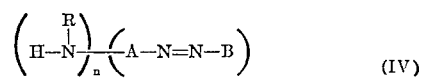
(IV)

wherein:

A represents the radical of a diazo component, particularly a radical of the benzene, diphenyl or naphthalene series which may be further substituted with an azo-compatible substituent or substituents, and B represents the radical of a coupling component coupled in a position adjacent to a hydroxyl or amino group;

R and $n$ have the meanings given in Formula I. Preferably A and B together contain at least two sulfonic acid groups.

These azo dyestuffs are obtained, for example, by coupling unsulfonated or sulfonated acylaminophenyl, acylaminodiphenyl or acylaminonaphthyl diazonium compounds or nitroaryl diazonium compounds, e.g. a diazotized acetylaminoaniline or 4-acetylamino-4'-amino-1,1'-diphenyl which may contain sulfonic acid groups, or a nitroaniline with conventional coupling components which couple in a position vicinal to a hydroxyl or amino group, e.g. with those of the benzene, naphthalene, pyrazolone, iminopyrazole, or acetoacetyl anilide series and then saponifying the acylamino group or reducing the nitro group to the amino group, or by coupling a diazonium compound with a coupling component containing acylatable groups, e.g. with an aminobenzene, aminonaphthalene or aminonaphthol, the components being so chosen and/or the operations being so performed that the coupling does not take place in a position vicinal to the amino group, also by coupling a diazonium compound with an aminoaryl-pyrazolone, an aminoaryl-iminopyrazole, or with an acetoacetylamino aralide or with sulfonic acid derivatives thereof.

Other valuable reactive dyes according to the invention are produced as described above from starting materials which are metal containing aminoazo dyestuffs of the formula

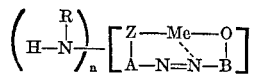
(V)

wherein A represents a radical of the benzene or naphthalene series which may be further substituted, B represents the radical of a component coupled in a position adjacent to a hydroxyl group, Me represents a heavy metal of the atomic number 24 to 29 which can also contain other coordinated complex formers, and Z represents oxygen or the COO— group, and R and $n$ have the meaning given in Formula I.

Such aminoazo dyestuffs preferably contain at least two sulfonic acid groups.

Such metallized aminoazo dyestuffs are obtained, firstly by coupling acylamino or nitrophenyl or nitronaphthyl diazonium compounds which are unsulfonated or sulfonated and which preferably contain a hydroxyl, alkoxy or carboxyl group in o-position to the diazonium group, with conventional coupling components which couple in a position vicinal to a hydroxyl group, e.g. with phenols, naphthols, pyrazolones or acetoacetyl arylides, or the sulfonic acid derivatives of these compounds; or secondly by coupling the usual aromatic diazonium compounds, particularly unsulfonated or sulfonated o-hydroxy-aryl, o-alkoxyaryl or o-carboxyaryl diazonium compounds with coupling components coupling in a position vicinal to a hydroxyl group, which coupling components may contain an acylated amino group, e.g. with an aminonaphthol or acylaminonaphthol or an aminonaphthol sulfonic acid or acylaminonaphthol sulfonic acid. Before or after hydrolysis of the acylamino group or reduction of the nitro group to the amino group, the aminoazo compounds obtained are converted with agents giving off chromium, cobalt or copper into their complexes, if necessary in the presence of an oxidising agent. To saturate any free co-ordination position, also other complex forming compounds, which may be of a dyestuff character, can be added to the metal, e.g. water, certain tertiary amines such as pyridine or another o,o'-dihydroxy- or o-hydroxy-o'-carboxy azo dyestuff.

Preferably, acid halides, e.g. chlorides or bromides, in particular 2,4-dichloropyrimidine-5-carboxylic acid chloride or bromide, are used as compounds which introduce the reactive grouping of Formula II into the process for producing reactive dyes, according to the invention.

Examples thereof are: 2-methyl-4-chloro- or 2-chloro-4-methyl-pyrimidine-5-carboxylic acid chloride, 2-ethyl- or 2 - methoxy - 4 - chloropyrimidine - 5 - carboxylic acid chloride, 2 - methylthio - 4 - fluoropyrimidine - 5 - carboxylic acid fluoride, 2 - methylthio- and 2 - ethylthio-4-chloropyrimidine-5-carboxylic acid chloride, 2,4-dibromopyrimidine-5-carboxylic acid bromide, 6-methyl-2,4-dichloropyrimidine-5-carboxylic acid chloride, 2,4,6-trichloro-pyrimidine-5-carboxylic acid chloride and, particularly, 2,4-dichloropyrimidine-5-carboxylic acid chloride.

These acid halides are obtained from hydroxypyrimidine carboxylic acids which are generally known and/or can be produced by known processes. They are produced, for example, by reacting hydroxypyrimidine carboxylic acids with phosphorus halides such as, e.g. phosphorus oxychloride, optionally in the presence of catalysts such as tertiary amines, to form the corresponding halogenopyrimidine carboxylic acids and then further reacting these carboxylic acids with thionyl halides such as, e.g. thionyl chloride. The fluorine compounds are produced, for example, by known processes by heating the corresponding chlorine compounds with potassium fluoride in dimethyl formamide, dimethyl sulfoxide or dimethyl sulfone.

The preferred 2,4-dichloropyrimidine-5-carboxylic acid chloride is a colorless liquid which boils at 83° C. under 0.05 torr and is produced for example, by reacting thionyl chloride with 2,4-dichloropyrimidine-5-carboxylic acid [J. Org. Chem. 80, p. 829, (1955)].

The reaction of amino dyestuff of Formula I with an acylating agent introducing the radical of Formula II is performed in aqueous solution, if desired, in the presence of inert organic solvents, e.g. lower alkanols, di-lower alkyl-ketones or lower fatty acid amides and preferably in the presence of acid-binding agents such as sodium acetate, sodium bicarbonate, sodium carbonate or sodium hydroxide.

The reaction is performed under mild conditions, preferably at a pH of 4 to 8 and at as low temperature as possible in order to prevent a premature exchange of substituents which can be split off. Mild conditions are also indicated when isolating and drying the reaction products.

Dyestuffs of Formula III are also obtained by a modified process, which comprises building up such dyestuffs from dyestuff components which contain at least one reactive grouping of Formula II bound by way of an amino group.

This mode of operation is suitable especially for the production of azo dyestuffs by coupling of an aromatic diazonium compound with a coupling component, in which case at least one of the two reactants contains the characteristic reactive acylamino group, according to the invention.

For example, a diazonium compound of the formula

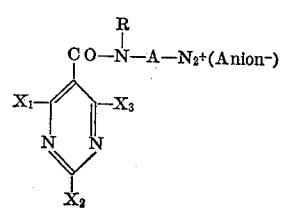
(VI)

wherein A represents a radical of the benzene, diphenyl or naphthalene series which may be further substituted, and (anion⁻) a suitable anion such as the chloride ion, R has the meaning given in Formula I and $X_1$, $X_2$ and $X_3$ have the meaning given in Formula II, is coupled with an azo component coupling in a position vicinal to a hydroxyl or amino group to form an azo dyestuff of the formula

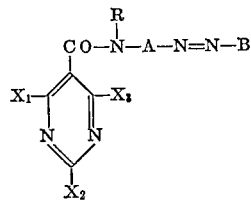

(VII)

wherein A has the meaning given above and B represents the radical of the coupling component coupled in a position vicinal to a hydroxyl or amino group; optionally, the metallizable dyestuffs so obtained are then reacted with agents introducing a heavy metal, especially copper, chromium, cobalt or nickel.

Diazonium compounds of Formula VI which are suitable for this purpose are derived, for example, from monoacyl arylene diamines which are unsulfonated or sulfonated and contain one of the pyrimidine-5-carbonyl radicals mentioned above. In particular they are unsulfonated or sulfonated 2,4-dichloropyrimidyl-5-carbonyl-amino-phenyl or -naphthyl diazonium compounds. Components to be coupled therewith are those usual in azo dyestuffs, for example those of the benzene series such as phenols or anilines or of the naphthalene series such as unsulfonated or sulfonated naphthols, naphthylamines, phenylaminonaphthols or acylaminonaphthols, furthermore, pyrazolones, aminopyrazoles and acetoacetyl arylides.

A further mode of carrying out the process for the production of reactive dyestuffs according to the invention consists in coupling an aryl diazonium compound $A—N_2^+$ with a coupling component of the formula

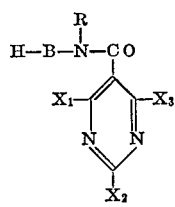

(VIII)

wherein R has the meaning given in Formula I and $X_1$, $X_2$ and $X_3$ have the meaning given in Formula II and B represents the radical of a component coupling in a position adjacent to a hydroxyl or amino group, to form a dyestuff of the formula

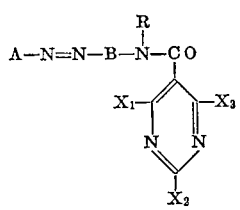

(IX)

wherein B has the meaning given in Formula VIII and

A represents a radical of the benzene, diphenyl or naphthalene series, which may be further substituted, and, if desired, converting the dyestuff thus obtained to a heavy metal complex thereof by treatment with agents setting free heavy metal, especially one of those mentioned above.

Diazotized aromatic amines suitable for this purpose are those conventional in azo dyestuffs, e.g. unsulfonated or sulfonated phenyl, diphenyl or naphthyl diazonium compounds.

In Formula VIII, B represents, more particularly the radical of an amino-hydroxy-naphthalene sulfonic acid, e.g. the radical of a 1-amino-6- or 7-hydroxynaphthalene sulfonic acid, 1-amino-8-hydroxynaphthalene-3,6- or -4,6-disulfonic acid, 2-amino-8-hydroxynaphthalene-6-sulfonic acid or 2-amino-5-hydroxynaphthalene-7-sulfonic acid, or the radical of an unsulfonated or sulfonated aminoaryl pyrazolone or aminoaryl pyrazolone imine or of an acetoacetyl amino arylide.

Azo dyestuffs containing two pyrimidyl-5-carbonyl groups of Formula II are obtained, for example, by coupling a diazonium compound of Formula VI with a coupling component of Formula VIII.

In each case, coupling is performed in a weakly acid to weakly alkaline medium by conventional methods.

Both the coupling and the metallisation must be performed under mild conditions, i.e. high pH values and temperatures must be avoided.

A further modification of the process for the production of reactive dyestuffs according to the invention comprises acylating a dyestuff of Formula I or a component of the dyestuff of Formula I containing the amino group —NH(R) with a compound introducing a reactive grouping of Formula II in which at least one X is halogen of the atomic number 17 or 35 and then reacting at least one halogen X which is bound to the pyrimidine ring of the said reactive grouping with a metal salt of sulfurous acid, a metal salt of a negatively ring-substituted phenol or thiophenol or with a tertiary preferably lower alkyl amine, and optionally, forming the dyestuff of Formula III from the dyestuff component. This subsequent replacement of a substituent which can be split off by another similar substituent makes it possible to alter the solubility and reactivity of the dyestuffs as desired.

The reaction of compounds usable according to the invention with a salt e.g. a soluble alkali metal or ammonium salt, in particular the sodium salt, or sulfurous acid or of a negatively ring substituted phenol or thiophenol or with a tertiary amine is preferably performed in aqueous solution, advantageously at a pH of about 6–10 and, optionally, in the presence of water-miscible, inert organic solvents such as di-(lower alkyl) ketones, e.g. acetone, lower fatty acid amides, e.g. N,N-dimethyl formamide; lower cyclic ethers, e.g. dioxan; optionally the reaction is performed at raised temperatures.

Examples of radicals which can be split off and which are subsequently introduced are; the sulfonic acid group, nitrophenoxy, nitrophenylthio, sulfophenoxy or sulfo phenylthio groups such as the 2,4-dinitrophenoxy, 4-sulfophenoxy or 4-nitrophenylthio group, the trimethylammonium group, pyridine group or 1,4-diazo-bicyclooctane group.

Another modification of the process for the production of reactive dyestuffs according to the invention comprises acylating a dyestuff of Formula I or a component of the dyestuff of Formula I containing the amino group –NH(R) with a compound introducing a reactive grouping of Formula II, wherein at least two of the symbols X are halogen of the atomic number 9, 17 or 35, and then reacting one halogen X bound to the pyrimidine ring of the said reactive grouping with a metal salt of an optionally substituted alkanol or thioalkanol, or with ammonia, a primary or secondary preferably lower alkyl amine or with a dyestuff of Formula I or a component of the dyestuff of Formula I containing an amino group –NH(R), and, optionally, forming the dyestuff of Formula III from one or two of the aforesaid dyestuff components.

This mode of operation is suitable, in particular, for the formation of technically valuable mixed shades such as, e.g. green, having high molar color strength.

The reaction of compounds usable according to the invention with a salt, e.g. a soluble alkali metal or ammonium salt, in particular with the sodium salt, of an alkanol or thioalkanol such as sodium methylate, ethylate, β-methoxyethylate, methyl-mercaptide, ethyl-mercaptide, or with the sodium salt of thioglycolic acid is performed advantageously in aqueous solution and, in the case of alkali metal alcoholates, also in aqueous-alcoholic solution, at room temperature. The condensation with ammonia, a primary or secondary amine or with one of the compounds containing amino groups mentioned above is also performed advantageously in aqueous solution, preferably in the presence of an excess of the amine used or of an acid binding agent such as sodium carbonate, sodium acetate or tertiary nitrogen bases. This condensation is performed at a pH of about 4–7, optionally in the presence of water-miscible inert organic solvents, e.g. those mentioned above and, optionally, it is performed at raised temperature.

Examples of such inert substituents are: the methoxy, ethoxy, β-methoxyethoxy, methylthio, ethylthio, carboxymethylthio group, the amino, methylamino, ethylamino, γ-carboxyproplamino, N,N-dimethylamino, N,N-diethylamino, phenylamino, carboxypenylamino, sulfophenylamino, N-methyl-N-sulfophenylamino group as well as the radicals of dyestuffs or components of the dyestuffs of Formula I, in particular the radicals containing amino groups described above, of azo, formazane, anthraquinone, and phthalocyanine dyestuffs.

The dyestuffs obtained can be stabilized in a conventional manner by mixing with buffering substances, e.g. with mixtures of primary and secondary alkali phosphates or with alkali metal salts of sulfonated tertiary aromatic amines, i.e. for example with the sodium salt of N,N-dimethylaniline-3-sulfonic acid.

Where in this specification and the appended claims dyestuffs substituted with water-solubilizing salt-forming groups are described, their free acid form as well as salts thereof, especially their salts with a monovalent cation, used conventionally in commercial dyeing techniques, such as sodium, or potassium or ammonium are also comprised thereby.

From other dyestuffs according to the invention which fall under Formulas IA, IB and IC, the following dyestuffs which are described under (1) to (8) inclusive, below, are distinguished by an outstanding combination of good fastness properties of the dyeings obtained therewith on fibers containing hydroxyl and/or amino groups, together with a particularly good reactivity for these fibers in the cold:

(1) Monoazo dyestuffs of the formula $$A^1—N=N—B^1—NR—CO—Q \quad (X)$$

wherein:

Q represents together with —NR—CO— one of the reactive groupings $Q^1$ of the formula

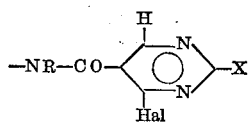

or $Q^2$ of the formula

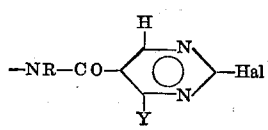

in which formulas:

R represents hydrogen or lower alkyl,

Hal represents chlorine, fluorine or bromine,

X represents lower alkylthio, or a halogen atom of the same atom number as Hal,

Y represents —$SO_3H$, —$NH_2$, —$NHR^3$,

—$OR^3$ or —$SR^3$; $R^3$ being lower alkyl, ω-hydroxyalkyl, ω-lower alkoxy-alkyl or ω-sulfo-alkyl, "alkyl" in the last three groups having from 2 to 4 carbon atoms, ω-carboxy-lower alkyl, phenyl, sulfophenyl, carboxy-phenyl;

and $R^4$ being lower alkyl, ω-carboxy-lower alkyl, ω-hydroxy-alkyl, ω-lower alkoxy-alkyl or ω-sulfo-alkyl, "alkyl" in the last three groups having from 2 to 4 carbon atoms, $A^1$ represents (a) a benzene radical, linked via its 1-position to the azo bridge and being substituted with a diazotation compatible combination selected from the following class of substituents: hydrogen, lower alkyl, lower alkoxy, chlorine, or (b) naphthyl-(1), sulfo-naphthyl-(1) or sulfo-naphthyl-(2);

$B^1$ represents (a) a divalent $Z^1$-substituted benzene radical linked with its 1-position to the azo bridge and with its 4-position to the reactive grouping —NR—CO—Q, or (b) a divalent $Z^2$-substituted naphthalene radical linked via its 1-position to the azo bridge and via one of its other ring carbon atoms, separated by at least one other ring carbon atom from that in 1-position, to the reactive grouping —NR—CO—Q, $Z^1$ representing a coupling-compatible combination selected from the following class of substituents: hydrogen, lower alkyl, lower alkoxy, lower alkanoylamino and ureido; and $Z^2$ representing a coupling-compatible combination of substituents selected from the group consisting of —$SO_3H$ and lower alkoxy, with hydrogen, $R^3$ and $R^4$ having the meaning given above;

(2) Monoazo dyestuffs of the formulas

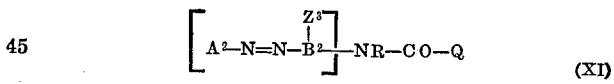

wherein:

R and Q have the same meanings as in Formula X, $A^2$ represents (a) a benzene radical, linked via its 1-position to the azo bridge and being substituted with a diazotation-compatible combination selected from the following class of substituents: hydrogen, lower alkyl, lower alkoxy, chlorine, fluorine, nitro, —$SO_3H$, —$COOH$, —$SO_2NH_2$, —$SO_2NHR^3$, —$SO_2NR^3R^4$, phenyl-$SO_2$—NH—$SO_2$ lower alkyl-sulfonyl, or phenyl, $R^3$ representing lower alkyl, phenyl, sulfophenyl, carboxyphenyl, ω-carboxy-lower alkyl, ω-hydroxy-alkyl, ω-lower alkoxy-alkyl, or ω-sulfo-alkyl, "alkyl" in the last three groups having from 2 to 4 carbon atoms; and $R^4$ representing lower alkyl, ω-carboxy-lower alkyl, ω-hydroxy-alkyl, ω-lower alkoxy-alkyl or ω-sulfo-alkyl, "alkyl" in the last three groups having from 2 to 4 carbon atoms, (b) naphthyl-(1), sulfo-naphthyl-(1) or sulfo-naphthyl-(2);

$Z^3$ is a substituent in o-position to the azo bridge at $B^2$ and selected from the group consisting of —OH and —$NH_2$, and $B^2$ represents (a) a naphthyl radical linked at one of the positions 1 and 2 to the azo bridge and further substituted, besides $Z^3$, with a coupling-compatible combination of substituents selected from the class consisting of hydrogen, —SO₃H, lower alkanoylamino and benzoylamino, or (b) a pyrazolyl radical, the 5-position of which is occupied by Z³, the 1-position of which is occupied by hydrogen, lower alkyl, phenyl, chlorophenyl, sulfophenyl, lower alkylphenyl, naphthyl or sulfonaphthyl, and the 3-position of which is occupied by lower alkyl or —COOH; the reactive grouping —NR—CO—Q being linked to a carbon atom of a six-membered ring of one of the moieties A² and B², which carbon atom is separated by at least two other ring carbon atoms from the azo bridge;

(3) Metallizable monoazo-dyestuffs of the formula

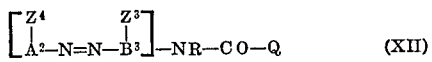

(XII)

wherein:

A², R, Q and Z³ have the meanings given hereinbefore,

Z⁴ is —OH, —COOH or —NH—SO₂—CH₃, in ortho position relative to the azo bridge at A², and B³ represents (a) a benzene radical substituted besides Z³, with a coupling-compatible combination of substituents selected from the class consisting of hydrogen, lower alkyl, lower alkoxy, lower alkanoylamino and benzoylamino, or (b) a naphthyl radical linked at one of the positions 1 and 2 to the azo bridge, and, further substituted, besides Z³, with a coupling-compatible combination of substituents selected from the class consisting of hydrogen, —SO₃H, lower alkanoylamino and benzoylamino, or (c) a pyrazolyl radical the 5-position of which is occupied by Z³, the 1-position of which is occupied by hydrogen, lower alkyl, phenyl, chlorophenyl, sulfophenyl, lower alkylphenyl, naphthyl or sulfonaphthyl, and the 3-position of which is occupied by lower alkyl or —COOH; the reactive grouping —NR—CO—Q being linked to a carbon atom of a six-membered ring of one of the moieties A² and B³, which carbon atom is separated by at least two other ring carbon atoms from the azo bridge; and the 2:1 metal complexes of the above dyestuffs with chromium or cobalt and the 1:1 metal complexes of the above dyestuffs with copper.

(4) Disazo dyestuffs of the formula

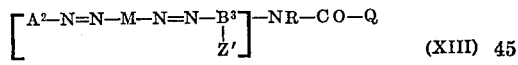

(XIII)

wherein:

A², B³, R and Q have the meanings given hereinbefore,

Z' is a substituent selected from the group consisting of hydrogen and hydroxy, and being in o-position to the azo bridge at B³, and M is a divalent radical of one of the formulas

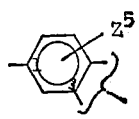

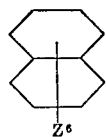

linked to the two azo bridges via two of its carbon atoms which are separated from each other by at least one other ring carbon atom,

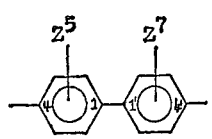

and

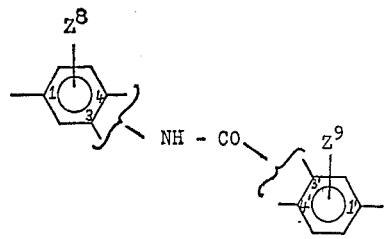

each of Z⁵ and Z⁷ being a member selected from the group consisting of hydrogen, hydroxy, lower alkyl, lower alkoxy and —SO₃H, Z⁶ being a member selected from the group consisting of hydrogen, hydroxy, lower alkoxy and —SO₃H, Z⁸ being a member selected from the group consisting of hydrogen, hydroxy and —SO₃H, and Z⁹ being a member selected from the group consisting of hydrogen and —SO₃H, and the 1:1 copper complexes, the 2:1-chromium complexes and the 2:1-cobalt complexes of those of the above dyestuffs of Formula XIII in which each of M and B³ is substituted with a hydroxyl group in ortho position to the azo bridge between these moieties, the reactive grouping —NR—CO—Q being linked to a carbon atom of a six-membered ring of one of the moieties A² and B³ which carbon atom is separated by at least two other ring carbon atoms from the next-adjacent azo bridge.

(5) Formazane dyestuffs of the formula

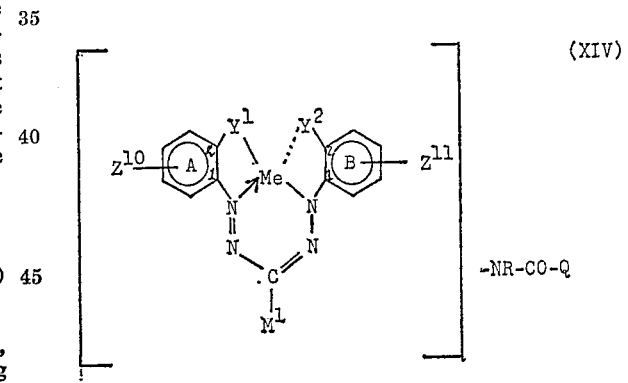

(XIV)

wherein:

R and Q have the meanings given hereinbefore,

Y¹ is —O— or —CO—O—,

Y² is —O— or —H . . . ,

M¹ represents lower alkylcarbonyl, hydrogen, cyano or a radical of the formula

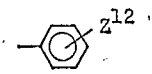

Z¹⁰ represents a diazotation-compatible combination of —SO₃H with other substituents selected from the class consisting of hydrogen, lower alkyl, lower alkoxy, chlorine, bromine, fluorine, nitro, —SO₃H, —COOH,

—SO₂NHR³, —SO₂NR³R⁴, lower alkyl-sulfonyl, phenyl, chlorophenyl, bromophenyl, lower alkyl-phenyl, lower alkoxy-phenyl, naphthyl or sulfonaphthyl, Z¹¹ represents a coupling-compatible combination of —SO₃H with other substituents selected from the group consisting of hydrogen, lower alkyl, lower alkoxy, lower alkanoylamino and benzoylamino, and $Z^{12}$ represents a formazane-compatible combination of substituents selected from the group consisting of hydrogen, chlorine, —$SO_3H$, —$SO_2NH_2$, —$SO_2NHR^3$ and —$SO_2NR^3R^4$, $R^3$ and $R^4$ having the meanings given hereinbefore, and the reactive grouping —NR—CO—Q being linked to a carbon atom of a six-membered ring of one of the molecular portions A, B and $M^1$, or of an aromatic six-membered substituent thereof; Me being one of the metals, Cu, Ni and Mn forming 1:1 complexes and Co forming 1:2 complexes;

(6) 4-amino-3-sulfonic acid-1-phenylamino-anthraquinones containing the reactive grouping —NR—CO—Q in the phenylamino group in m- or p-position to the amino group of the latter;

(7) Sulfonated copper phthalocyanine dyes containing at least one of the following substituents: N-alkylaminosulfonyl, N - phenylamino - sulfonyl, N-(sulfophenyl)-amino-sulfonyl containing the reactive grouping

—NR—CO—Q in the alkyl and phenyl moiety, respectively, of the last-mentioned substituents.

(8) Dyestuffs of Formula IC, supra, in which $D_1$ and $D_2$ represent the following combinations: (a) $D_1$ represents a monoazo dyestuff as defined under (1), (2) or (3), supra, and $D_2$ represents a monoazo dyestuff as defined under (2) or (3), (b) $D_1$ represents a monoazo dyestuff as defined under (2) or an anthraquinone dyestuff as defined under (6), and $D_2$ represents an anthraquinone dyestuff as defined under (6) or a monoazo dyestuff as defined under (1), supra, (c) $D_1$ represents a monoazo dyestuff as defined under (1) and $D_2$ represents a phthalocyanine as defined under (7) or vice versa.

The dyestuffs according to the invention containing no or only one sulfonic acid group are useful, in fine aqueous dispersion, for the dyeing of hydrophobic fibers, in particular of synthetic polyamide fibers such as nylon. The preferred dyestuffs according to the invention contain water-solubilizing, salt-forming groups and are suitable for the dyeing of natural and synthetic polyamide fibers containing amino groups. An after-treatment of these dyeings with acid-binding agents such as ammonia or hexamethylenetetramine causes an improvement in their wet fastness properties. Water-soluble dyestuffs according to the invention having from 2 to 5 water-solubilizing, preferably sulfonic acid groups, are used for the dyeing and printing of fibers containing hydroxyl groups, particularly for the dyeing and printing of natural or regenerated cellulose fibers.

Water-soluble dyestuffs according to the invention, namely those of Formulas IA, IB and IC, and particularly those listed under (1) to (8) above, which possess from 2 to 5 water-solubilizing groups per molecule, are distinguished by their rapidity of fixation and color yield on substrates containing hydroxyl groups as well as on those containing amino groups.

The preferred water-soluble 2,4-dihalogenopyrimidine-5-carboxylic acid amide dyestuffs listed under (1) to (8) above are extraordinarily highly reactive, in particular, on cellulose fibers. These dyestuffs fix quickly, even under mild conditions, and are thus excellently suitable for cold treatment or short dyeing processes.

The dyestuffs are applied either by impregnating the textiles with aqueous dyestuffs solutions or by printing them with thickened dyestuffs solutions. The alkali such as aqueous sodium carbonate, trisodium phosphate or sodium hydroxide solution, necessary for the fixing process can even be added to the dyestuff solution but, because of the high reactivity of the mobile groups, care must be taken to ensure that the dyestuff and alkali are only mixed immediately before pad-dyeing. The fixing process, however, can also be performed with very weak alkalies such as sodium acetate or secondary potassium or sodium phosphate, or with compounds which only have an alkaline reaction on heating such as sodium bicarbonate or sodium trichloroacetate. In such cases, the dyestuff solutions are stable for a prolonged time. The textile fibers impregnated or printed with the dyestuffs can also be dried first and subsequently treated in a second bath containing alkaline solutions, which bath can also contain neutral salts. In many cases, the dyestuff is fixed in the presence of substances having an alkaline reaction even by a treatment in the cold, but, if desired, the fixing can be accelerated by heating or steaming.

After thoroughly rinsing and soaping, dyeings and prints are obtained which are distinguished by excellent wet fastness and good light fastness properties. The dye liquors and printing pastes containing reactive dyestuffs according to the invention can also contain further additives, for example, salts such as sodium sulfate or sodium chloride, or auxiliaries such as acid amides, e.g. urea, or additives to prevent reduction such as nitrobenzene sulfonic acids.

Dyestuffs according to the invention which have a certain degree of substantivity can also be dyed by the exhaustion process, i.e. from a long bath, but the dyeing temperature then depends also on the alkali used. For example, in the presence of sodium carbonate and sodium sulfate, dyeing is performed at a temperature of 20-50°, preferably at 25-35°.

The dyestuffs according to the invention can be applied to cellulose fibers by known processes simultaneously with a resin-forming compound and an acid catalyst so that the fibers are simultaneously dyed and made fast to creasing.

The dyeings attained with these dyestuffs are distinguished by the good stability of the dyestuff-fiber bond to hydrolytic influences, which is surprising in view of the extraordinarily high reactivity of the dyestuffs. In particular they have very good fastness to washing and sea water.

The following non-limitative examples illustrate the invention further. Where not otherwise expressly stated, parts and percentages are given by weight. The temperatures are in degrees centigrade. The relationship of parts by weight to parts by volume is as that of grams (g.) to milliliters (ml.).

EXAMPLE 1

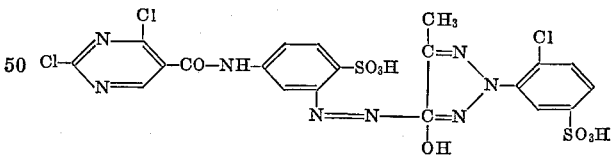

18.8 parts of 1,3-diaminobenzene-4-sulphonic acid and sodium carbonate are dissolved in 400 parts of water, the solution having a pH of 4.0-4.5, and the solution is cooled to 0-5°. 22.2 parts of 2,4-dichloropyrimidine-5-carboxylic acid chloride dissolved in 100 parts of acetone are added dropwise within 15 minutes at this temperature, the pH of the mixture being maintained at 4.0-4.5 by the simultaneous addition of sodium carbonate solution. As soon as the reaction is complete, 25 parts of 30% hydrochloric acid are added to the reaction product which is then diazotised at 0-5° with 6.9 parts of sodium nitrite. The suspension of the diazonium compound is poured into a solution of the sodium salt of 28.9 parts of 1-(2'-chloro-5'-sulphophenyl)-3-methyl-5-pyrazolone in 200 parts of water and 40 parts of sodium acetate. On completion of the coupling, the new dyestuff is precipitated with sodium chloride, filtered off, washed with dilute sodium chloride solution and dried in vacuo at 40-50°. It is a yellow powder which dissolves in water with a greenish yellow colour.

The new dyestuff dyes cotton, staple fibre, jute, ramie, hemp, wool, silk and nylon by processes usual for reactive dyestuffs in pure yellow shades which are fast to wet treatments and light.

The 2,4-dichloropyrimidine-5-carboxylic acid chloride used in this example is obtained by heating the corresponding carboxylic acid (described in Journal of Organic Chemistry, vol. 20, 1955, page 829) with an excess of thionyl chloride until a clear solution is obtained, distilling off the excess thionyl chloride and distilling the residue under high vacuum. It is a colourless liquid which boils at 83° under 0.05 Torr.

Yellow dyestuffs having similar properties are obtained if, instead of the 28.9 parts of 1-(2'-chloro-5'-sulphophenyl)-3-methyl-5-pyrazolone, an equivalent amount of the coupling components listed in the following table are used and the methods described in the example are followed.

Table 1

| Example No. | Coupling component |
| --- | --- |
| 2 | 1 - (2',5' - disulphophenyl) - 3 - methyl-5-pyrazolone. |
| 3 | 1 - [5',7' - disulphonaphthyl - (2')] - 3 - 5-pyrazolone. |
| 4 | 1 - (4' - sulphophenyl) - 5 - pyrazolone-3-carboxylic acid. |
| 5 | 1 - (3' - sulphophenyl) - 3 - methyl - 5 - pyrazolone. | amide fibres by processes usual for reactive dyestuffs in pure yellow shades which have good wet and light fastness properties.

Further monoazo dyestuffs according to the invention which fall under the formula $$A^1-N=N-B^1-NR-CO-Q$$

as defined under (1) as Formula X supra, and in which Q represents a reactive grouping of the formula <chemical structure: pyrimidine ring with Hal and X substituents> as defined above under Formula IA, are obtained by reacting equimolar amounts of correspondingly substituted reactants with each other in accordance with the procedure given in Example 6, supra; the structural elements $A^1$, and $B^1$ of the dyestuffs thus obtained are given in columns II and II of the following Table 2, the position of the above reactive grouping at the moiety $B^1$ and the substituents R, Hal and X in the latter are shown in columns IV, V and VI, respectively, and the shade of dyeings obtained with the respective dyestuff on cellulosic materials is given in column VII.

TABLE 2

| Example Number | $A^1$ | $B^1$ | Position of react. grouping at $B^1$ | R | Hal | X | Shade |
| --- | --- | --- | --- | --- | --- | --- | --- |
| 7 | 5,7-disulfonaphthyl-(2) | Phenylene | 4 | H | Cl | Cl | Yellow. |
| 8 | 4,8-disulfonapthyl-(2) | 2-methyl-5-methoxy-phenylene | 4 | H | Cl | Cl | Reddish yellow. |
| 9 | 4,6,8-trisulfonaphthyl-(2) | Phenylene | 4 | $C_2H_5$ | Cl | Cl | Yellow. |
| 10 | 6,8-disulfonaphthyl-(2) | 2-methylphenylene | 4 | H | Br | Br | Do. |
| 11 | 3,6,8-trisulfonaphthyl-(1) | 2-acetylaminophenylene | 4 | $CH_3$ | F | F | Reddish yellow. |
| 12 | 3,6-disulfonaphthyl-(1) | 2-ureidophenylene | 4 | H | Cl | $SCH_3$ | Do. |
| 13 | 2-carboxy-4-sulfophenyl-(1) | 7-sulfonaphthylene | 4 | H | F | F | Yellowish brown. |
| 14 | 2-methyl-4-sulfophenyl-(1) | 6-sulfonaphthylene | 4 | H | Cl | Cl | Do. |
| 15 | 2-methoxy-5-sulfophenyl-(1) | 3-methoxy-7-sulfonaphthylene | 4 | H | Br | $SC_2H_5$ | Do. |
| 16 | 2-sulfo-4-chlorophenyl-(1) | 6-sulfonaphthylene | 4 | H | Cl | Cl | Do. |
| 17 | 4,8-disulfonaphthyl-(2) | do. | 4 | H | Cl | Cl | Do. |
| 18 | Naphthyl-(1) | 3-methoxynaphthylene | 4 | $CH_3$ | Br | Br | Red. |

EXAMPLE 6

<chemical structure: naphthalene with two $SO_3H$ groups, -N=N-, phenyl with $CH_3$, -NH·CO-, dichloropyrimidine>

42.1 parts of the aminomonoazo dyestuff of the formula

<chemical structure: naphthalene with $SO_3H$ groups, -N=N-, phenyl with $CH_3$, -NH_2>

(produced by diazotising 2-aminonaphthalene-4,8-disulphonic acid and coupling the diazonium compound with 1-amino-3-methylbenzene in the presence of alkali metal salts of fatty acids) are dissolved, in the form of the sodium salt, in 400 parts of water. At 0–5°, 22.2 parts of 2,4-dichloropyrimidine-5-carboxylic acid chloride dissolved in 100 parts of acetone are added dropwise within 1 hour and the pH of the reaction mixture is kept at 6.5–7.0 by the simultaneous addition of sodium carbonate solution. As soon as no more free amino groups can be detected, the reaction product is precipitated by the addition of sodium chloride, filtered off and washed with dilute sodium chloride solution. The new dyestuff is dried at 40–50° in vacuo. It is a yellow powder which dissolves in water with a yellow colour. It dyes cellulose and poly-

EXAMPLE 19

<chemical structure: naphthalene with $SO_3H$, $HO_3S$, HO, -N=N-, -NH-CO-, dichloropyrimidine>

31.9 parts of 1-amino-8-hydroxynaphthalene-3,6-disulfonic acid are dissolved at 0–5° in 200 parts of water, the pH being adjusted to 6.5 by the addition of sodium hydroxide solution. Then the solution is brought to a pH value of 2 and a solution of 22.2 parts of 2,4-dichloropyrimidine-5-carboxylic acid chloride in 100 parts of acetone is added dropwise to this solution within 15 minutes, during which addition the pH of the reaction mixture is kept at 2 by the addition of sodium carbonate solution. When no more free amino groups can be traced, 30 parts of sodium bicarbonate are added to the solution and then a solution of 17.3 parts of diazotized 1-amino-benzene-2-sulfonic acid is poured in. As soon as the coupling is complete, sodium chloride is added to the reaction mixture, the precipitate dyestuff is filtered off and washed with sodium chloride solution. After drying at 40–50°, a red powder is obtained which dissolves easily in water with a red color.

If cotton or staple fiber is dyed or printed with this dyestuff by the methods usual for reactive dye-stuffs, then red dyeings or prints are obtained which have very good fastness properties.

Further monoazo dyestuffs according to the invention which fall under the formula

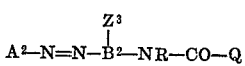

falling under (2) Formula XI supra, and in which Q represents a reactive grouping of the formula

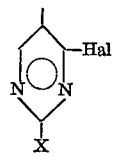

as defined above under Formula IA, are obtained by reacting correspondingly substituted reactants with each other in accordance with the procedure given in Example 19, supra; the structural elements $A^2$ and $B^2$ of the dyestuff thus obtained are given in columns I and II of the following Table 3, the position of the above reactive grouping at the moiety $B^1$ and the substituents Hal, X and R in the latter are shown in columns VI, VII and VIII, respectively, and the shade of dyeings obtained with the respective dyestuff on cellulosic materials is given in column IX.

(obtained by coupling diazotized 2-amino-4-nitrobenzene sulfonic acid with 1-benzoylamino-8-hydroxynaphthalene-3,6-disulfonic acid in a neutral medium and reducing the nitroazo dyestuff with sodium sulfide) are dissolved in 500 parts of water. At 0–5°, 22.2 parts of 2,4-dichloropyrimidine-5-carboxylic acid chloride, dissolved in 100 parts of acetone are added dropwise, the pH of the reaction solution being kept at 4.5–5.5 by the addition of sodium carbonate solution. As soon as no more free amino groups can be detected, the dyestuff is completely precipitated by the addition of sodium chloride, filtered off and dried in vacuo at 40–50°. It dissolves easily in water with a blueish red color and dyes cellulose and polyamide fibers by processes usual for reactive dyestuffs in pure blueish red shades which are wet fast.

Further monoazo dyestuffs according to the invention which fall under the formula

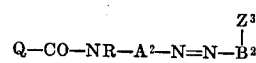

TABLE 3

| | I | II | III | IV | V | VI | VII | VIII | IX |
|---|---|---|---|---|---|---|---|---|---|
| Ex. No. | $A^2$ | $B^2$ | $Z^3$ | Position of $Z^3$ at $B^2$ | Pos. of react. grouping at $B^2$ | Hal | X | R | Shade |
| 20 | 2,5-disulfophenyl-(1) | 3-sulfonaphthylene-(2) | OH | 1 | 6 | Cl | Cl | H | Orange. |
| 21 | 2,4-disulfophenyl-(1) | do | OH | 1 | 6 | Cl | Cl | CH₃ | Reddish orange. |
| 22 | do | 8-benzoylamino-3,6-disulfonaphthylene-(2). | OH | 1 | 3′ (at benzoyl) | Br | Br | H | Red. |
| 23 | 3-sulfamidophenyl-(1) | 3,6-disulfonaphthylene-(2) | OH | 1 | 8 | F | SCH₃ | H | Red. |
| 24 | 3-[N-methylsulfamido]-phenyl-(1) | do | OH | 1 | 8 | F | F | H | Red. |
| 25 | 3-[N-ω-carboxyethyl-N-methyl-sulfamido]-phenyl-(1). | do | OH | 1 | 8 | F | SCH₃ | H | Red. |
| 26 | 3-[N-ω-hydroxypropyl-N-methyl-sulfamido]-phenyl-(1). | do | OH | 1 | 8 | Cl | SC₂H₅ | H | Red. |
| 27 | 3-[N-methyl-N-ω-methoxyethyl-sulfamido]-phenyl-(1). | do | OH | 1 | 8 | Cl | Cl | H | Red. |
| 28 | 3-[N-ethyl-N-ω-sulfoethyl-sulfamido]-phenyl-(1). | do | OH | 1 | 8 | Cl | Cl | H | Red. |
| 29 | 3-[-2′-carboxyphenylsulfamido]-phenyl-(1). | 3,5-disulfonaphthylene-(2) | OH | 1 | 8 | Cl | SCH₃ | H | Red. |
| 30 | 4-methyl-2-sulfophenyl-(1) | do | OH | 1 | 8 | Br | Br | H | Red. |
| 31 | 3-carboxyphenyl-(1) | do | OH | 1 | 8 | Cl | Cl | H | Red. |
| 32 | 2-methoxy-4-sulfophenyl-(1) | 3-sulfonaphthylene-(2) | OH | 1 | 6 | Cl | Cl | CH₃ | Orange. |
| 33 | 4-chloro-2-sulfophenyl-(1) | do | OH | 1 | 6 | Cl | SCH₃ | H | Do. |
| 34 | 4-fluoro-2-sulfophenyl-(1) | do | OH | 1 | 6 | F | SC₂H₅ | H | Do. |
| 35 | 2,5-disulfophenyl-(1) | 3,6-disulfonaphthylene-(2) | OH | 1 | 8 | Cl | Cl | H | Red. |
| 36 | 2,4-disulfophenyl-(1) | do | OH | 1 | 8 | Cl | Cl | H | Red. |
| 37 | 2-sulfophenyl-(1) | 3,5-disulfonaphthylene-(2) | OH | 1 | 8 | Cl | Cl | H | Blueish red. |
| 38 | 2,4-disulfophenyl-(1) | 1-[4′-(Q-CO-NH)-phenyl]-3-methyl pyrazole-(4). | OH | 5 | 4′ | Cl | Cl | H | Yellow. |
| 39 | 4-methoxy-6-sulfophenyl-(1) | 3-sulfonaphthylene-(2) | OH | 1 | 6 | Cl | Cl | H | Scarlet. |
| 40 | 1,5-disulfonaphthyl-(2) | 3,6-disulfonaphthylene-(2) | OH | 1 | 8 | Cl | Cl | H | Red. |
| 41 | 4-nitro-6-sulfophenyl-(1) | do | OH | 1 | 8 | Cl | Cl | H | Blueish red. |
| 42 | 2-sulfo-4-phenyl-phenyl-(1) | do | OH | 1 | 8 | Br | Br | H | Red. |

EXAMPLE 43

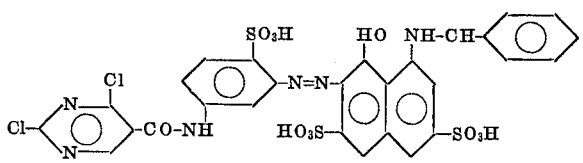

62.2 parts of the sodium salt of the aminoazo dyestuff of the formula

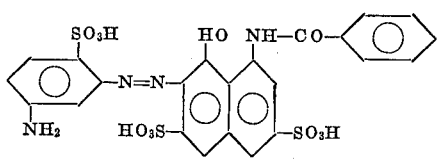

falling under (2) (Formula XI) supra, and in which Q represents a reactive grouping of the formula

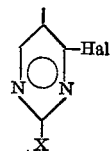

as defined above under Formula IA, are obtained by reacting correspondingly substituted reactants with each other in accordance with the procedure given in Example 42, supra; the structural elements $A^2$, and $B^2$ of the dyestuffs thus obtained are given in columns II and III of the following Table 4, the position of the above reactive grouping at the moiety $A^2$ and the substituents Hal, X and R in the latter are shown in columns VII, VIII and IX etc. respectively, and the shade of dyeings obtained with the respective dyestuff on cellulosic materials is given in column X, $Z^3$ is shown in column IV, the position of $Z^3$ is shown in column V and the position of reactive grouping at $A^2$ is shown in column VI.

TABLE 4

| I Ex. No. | II | III | IV | V | VI | VII | VIII | IX | X |
|---|---|---|---|---|---|---|---|---|---|
| 44 | 6-sulfophenylene (1) | 8-benzoylamino-3,5-disulfonaphthyl-(2) | OH | 1 | 3 | Cl | Cl | H | Red. |
| 45 | do | 8-acetylamino-3,6-disulfonaphthyl-(2) | OH | 1 | 3 | Cl | Cl | H | Red. |
| 46 | do | 1-[4'-sulfophenyl]-3-carboxy-pyrazole-(4) | OH | 5 | 4 | Cl | Cl | H | Reddish-yellow. |
| 47 | do | 1-[3'-sulfophenyl]-3-methyl-pyrazole | $NH_2$ | 5 | 4 | Br | Br | H | Yellow. |
| 48 | do | 6,8-disulfonaphthyl-(1) | OH | 2 | 3 | Cl | Cl | H | Yellowish-orange. |
| 49 | do | 3,6-disulfonaphthyl-(2) | OH | 1 | 3 | F | F | H | Orange. |
| 50 | do | 4,6-disulfonaphthyl-(2) | OH | 1 | 3 | Cl | Cl | H | Scarlet. |
| 51 | do | 5,7-disulfonaphthyl-(1) | $NH_2$ | 2 | 3 | Cl | $SC_2H_5$ | H | Orange. |
| 52 | do | 1-[naphthyl-2']-3-methyl-pyrazole-(4) | OH | 3 | 3 | Cl | Cl | H | Reddish-yellow. |
| 53 | do | Naphthyl-(1) | OH | 2 | 3 | Cl | Cl | H | Orange. |

EXAMPLE 54

32.7 parts of the disulfimide of the formula

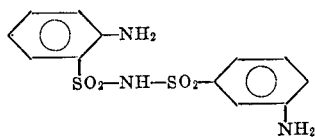

are slurried in 200 parts of water. A solution of 22.2 parts of 2,4-dichloropyrimidine-5-carboxylic acid chloride in 100 parts of acetone is added at 0°–5° and the pH of the reaction mixture is maintained during the reaction at 6.0–7.0 with aqueous sodium carbonate solution. The product of the formula

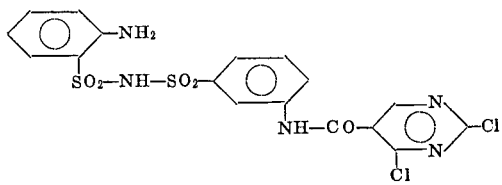

is precipitated by the addition of sodium chloride, separated by filtration and dried in vacuo at 40°–50° C. 50.3 parts of the condensation product of the above formula are dissolved in 500 parts of water and acidified with 25 parts of aqueous 30%-hydrochloric acid. Then 6.9 parts of sodium nitrite are added at 5°–10° C. When the diazotation is terminated, a neutral solution of 42.3 parts of 1-benzoylamino-8-hydroxy-naphthalene-3,6-disulfonic acid in 200 parts of water is added, and the pH is maintained throughout the reaction at 7.0–7.5 by adding aqueous solution of sodium-bicarbonate as necessary.

The fiber-reactive dyestuff of the formula

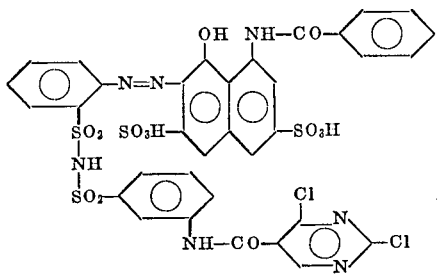

is precipitated by the addition of sodium chloride, separated by filtration and dried in vacuo of 40°–50° C. It dyes cellulosic fibers with a red shade and good fastness properties.

EXAMPLE 55

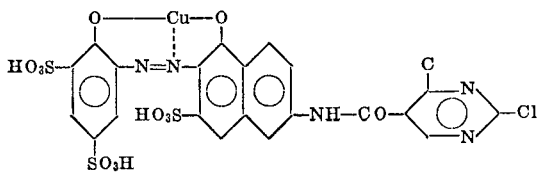

51.7 parts of the sodium salt of the copper containing amino monoazo dyestuff of the formula

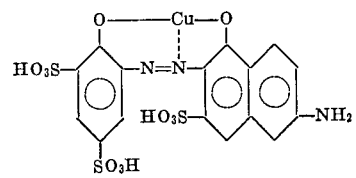

(produced by coupling diazotized 2-amino-1-hydroxybenzene-4,6-disulfonic acid with 2-amino-5-hydroxyphthalene-7-sulfonic acid in an alkaline medium and treating the aminomonoazo dyestuff obtained with an agent giving off copper) are dissolved in 500 parts of water.

At 0–5°, a solution of 22.2 parts of 2,4-dichloropyrimidine-5-carboxylic acid chloride in 150 parts of acetone is added and the pH of the reaction solution is kept at 6.5–7.5 by the addition of sodium carbonate solution. As soon as no more free amino groups can be traced, the new dyestuff is completely precipitated by the addition of sodium chloride, filtered off and dried in vacuo at 50–60°. It is a dark powder which dissolves in water with a ruby color.

It dyes cotton, stable fiber, jute, ramie, hemp, wool, silk and nylon by processes usual for reactive dyestuffs, in pure ruby shades which are wet fast.

Further monoazo dyestuffs according to the invention which fall under the formula

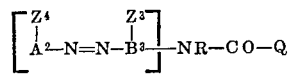

falling under (3) as Formula XII supra, and in which Q represents a reactive grouping of the formula

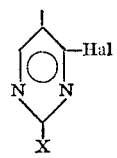

as defined above under Formula IA, are obtained by reacting correspondingly substituted reactants with each other in accordance with the procedure given in Example 55 supra, the structural elements $A^2$, and $B^3$ of the dyestuffs thus obtained are given in columns II and V of the following table, the position of the above reactive grouping at the moieties $A^2$ or $B^3$ and the substituents $Z^3$, R, Hal and X in the reactive grouping are shown in columns VI, VII, VIII and IX, respectively, and the shade of dyeings obtained with the respective dyestuff on cellulosic materials is given in column XII, the substituent $Z^3$, is shown in column VI, the substituent $Z^4$ is shown in column III and its position in column IV and the metal is shown in column X.

TABLE 5

| Ex. No. | II | III | IV | V | VI | VII | VIII | IX | X | XI | XII |
|---|---|---|---|---|---|---|---|---|---|---|---|
| 56 | 5-sulfophenyl-(1) | OH | 2 | 3,6-disulfonaphthylene-(2) | 1-OH | H | Cl | Cl | Cu | 8B | Violet. |
| 57 | 3,5-disulfophenyl-(1) | OH | 2 | 3-sulfonaphthylene-(2) | 1-OH | H | Cl | Cl | Cu | 7B | Bordeaux. |
| 58 | 4-sulfo-6-nitronaphthyl-(1) | OH | 2 | 3-sulfonaphthylene-(2) | 1-OH | H | Cl | Cl | Cr 1:2 | 6B | Black. |
| 59 | 5-nitrophenyl-(1) | OH | 2 | 3,6-disulfonaphthylene-(2) | 1-OH | CH₃ | Cl | Cl | Cr 1:2 | 8B | Do. |
| 60 | do | OH | 2 | do | 1-OH | H | Br | Br | Co 1:2 | 8B | Black/brown. |
| 61 | 3-sulfophenylene-(1) | OH | 2 | 5,7-disulfo-8-amino-naphthyl-(2) | 1-OH | H | Cl | Cl | Cu | 5A | Reddish navy-blue. |
| 62 | do | OH | 2 | 3,5-disulfo-8-phenylamino-naphthyl-(2) | 1-OH | C₂H₅ | F | F | Cu | 5A | Navy-blue. |
| 63 | 4-sulfonaphthylene-(1) | OH | 2 | 5,7-disulfo-8-amino-naphthyl-(2) | 1-OH | H | Cl | Cl | Cu | 6A | Blue. |
| 64 | 5-sulfophenylene-(1) | OH | 2 | 4,6-disulfonaphthyl-(2) | 1-OH | CH₃ | Cl | Cl | Cu | 3A | Ruby. |
| 65 | do | OH | 2 | 1-(2′,5′-disulfophenyl)-3-methyl-pyrazole-(4) | 5-OH | H | Cl | Cl | Cu | 3A | Yellow/brown. |
| 66 | 5-methylsulfonylphenyl-(1) | OH | 2 | 3,6-disulfonaphthylene-(2) | 1-OH | H | F | F | Cu | 8B | Violet. |
| 67 | 5-methylphenyl-(1) | OH | 2 | do | 1-OH | H | Br | Br | Cu | 8B | Do. |
| 68 | Phenyl-(1) | COOH | 2 | do | 1-OH | H | Cl | Cl | Cu | 8B | Ruby. |
| 69 | 5-methoxyphenyl-(1) | OH | 2 | do | 1-OH | CH₃ | Cl | SCH₃ | Cu | 8B | Violet. |
| 70 | 5-chlorophenyl-(1) | OH | 2 | 3,5-disulfonaphthylene-(2) | 1-OH | H | Cl | Cl | Cu | 8B | Do. |
| 71 | 5-bromophenyl-(1) | OH | 2 | do | 1-OH | H | Br | Br | Cu | 8B | Do. |
| 72 | 5-fluorophenyl-(1) | OH | 2 | do | 1-OH | H | F | F | Cu | 8B | Do. |
| 73 | Phenyl-(1) | Methyl sulfamyl | 2 | 3-sulfonaphthylene-(2) | 1-OH | H | Cl | Cl | Cu | 8B | Ruby. |
| 74 | 5-aminosulfonylphenyl-(1) | OH | 2 | 3,6-disulfonaphthylene-(2) | 1-OH | CH₃ | Cl | Cl | Cu | 8B | Violet. |
| 75 | 5-methylamino-sulfonyl-phenyl-(1) | OH | 2 | do | 1-OH | H | Cl | Cl | Cu | 8B | Do. |
| 76 | 5-phenylamino-sulfonyl-phenyl-(1) | OH | 2 | do | 1-OH | H | Cl | Cl | Cu | 8B | Do. |
| 77 | 5-(2′-carboxyphenyl)-aminosulfonylphenyl-(1) | OH | 2 | do | 1-OH | H | Br | Br | Cu | 8B | Do. |
| 78 | 5-dimethylamino-sulfonyl-phenyl-(1) | OH | 2 | do | 1-OH | H | Cl | Cl | Cu | 8B | Do. |
| 79 | 5-methylphenylamino-sulfonylphenyl-(1) | OH | 2 | do | 1-OH | H | Cl | Cl | Cu | 8B | Do. |
| 80 | 5-methyl-N-β-carboxyethyl-amino-sulfonylphenyl-(1) | OH | 2 | 3,6-disulfonaphthylene-(2) | 1-OH | H | Cl | Cl | Cu | 8B | Do. |
| 81 | 5-methyl-N-β-hydroxyethyl-amino-sulfonylphenyl-(1) | OH | 2 | Phenylene-(2) | 1-OH | H | Br | Br | Cu | 5B | Brown. |
| 82 | 5-methyl-N-β-methoxyethyl-amino-sulfamylphenyl-(1) | OH | 2 | do | 1-OH | H | Br | Br | Cu | 5B | Do. |
| 83 | 5-methyl-N-β-sulfoethyl-amino-sulfamylphenyl-(1) | OH | 2 | do | 1-OH | H | Br | Br | Cu | 5B | Do. |
| 84 | 3-sulfophenylene-(1) | OH | 2 | 3,6-disulfo-8-acetylamino-naphthyl-(2) | 1-OH | H | Cl | SCH₃ | Cu | 5A | Blueish violet. |
| 85 | do | OH | 2 | 3,6-disulfo-8-benzoyl-amino-naphthyl-(2) | 1-OH | H | Cl | SC₂H₅ | Cu | 5A | Do. |
| 86 | do | OH | 2 | Naphthyl-(2) | 1-OH | H | Cl | Cl | Cu | 5A | Brown. |
| 87 | 5-sulfophenylene-(1) | OH | 2 | 3-methyl-pyrazole-(4) | 5-OH | H | Cl | Cl | Cu | 3A | Yellow/brown. |
| 88 | do | OH | 2 | 1-(4′-sulfophenyl)-3-carboxypyrazole-(4) | 5-OH | H | Cl | SCH₃ | Cu | 3A | Do. |
| 89 | do | OH | 2 | 1-ethyl-3-methyl-pyrazole-(4) | 5-OH | H | Cl | Cl | Cu | 3A | Do. |
| 90 | do | OH | 2 | 1-phenyl-3-methyl-pyrazole-(4) | 5-OH | H | Cl | Cl | Cu | 3A | Do. |
| 91 | do | OH | 2 | 1-(4′-chlorophenyl)-3-carboxy-pyrazole-(4) | 5-OH | H | Cl | Cl | Cu | 3A | Do. |
| 92 | 3-sulfophenylene-(1) | OH | 2 | 1-(4′-methylphenyl)-3-carboxypyrazole-(4) | 5-OH | H | Cl | Cl | Cu | 5A | Do. |
| 93 | do | OH | 2 | 1-[naphthyl-(1)]-3-methyl-pyrazole-(4) | 5-OH | H | Br | Br | Cu | 5A | Do. |
| 94 | do | OH | 2 | 1-(4′,8′-disulfo-naphthyl-(2)]-3-methyl-pyrazole-(4) | 5-OH | H | Cl | Cl | Cu | 5A | Do. |
| 95 | 4-sulfo-6-nitronaphthyl-(1) | OH | 2 | 4-methyl-phenylene-(2) | 1-OH | H | Cl | Cl | Cu | 5B | Red-brown. |
| 96 | 4-sulfo-6-nitronaphthyl-(1) | OH | 2 | 4-methoxy-phenylene-(2) | 5-OH | H | Br | Br | Cu | 5B | Do. |
| 97 | do | OH | 2 | Phenylene-(2) | 5-OH | H | Cl | Cl | Cu | 5B | Do. |
| 98 | 4-sulfo-naphthylene-(1) | OH | 2 | 4-methyl-6-acetylamino-phenyl-(2) | 1-OH | H | Cl | Cl | Cu | 6A | Do. |
| 99 | do | OH | 2 | 4-methyl-6-benzoylamino-phenyl-(2) | 1-OH | H | Cl | Cl | Cu | 6A | Do. |

EXAMPLE 100

41.9 parts of the amino monoazo-dyestuff of the formula:

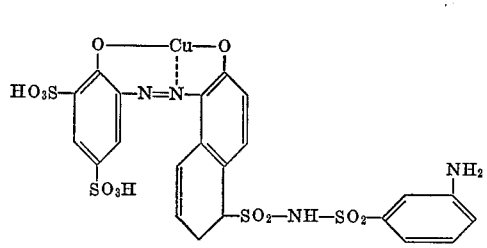

produced as described in Example 2 of Belgian Patent No. 603,191, are disolved in 800 parts of water. A solution of 22.2 parts of 2,4 - dichloropyrimidine-5-carboxylic acid chloride is added dropwise at 0 to 5° C. and the pH of the reaction mixture is maintained during the reaction at 6.0–6.5 with aqueous sodium carbonate solution. The fiber-reactive dyestuff formed, of the formula

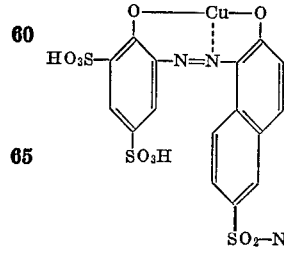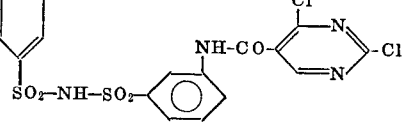

is precipitated by the addition of sodium chloride, filtered off and dried in vacuo at 40°–50° C. It dissolves easily in water with a bordeaux-red color, and dyes cellulosic fibers wet-fast in the same shade.

EXAMPLE 101

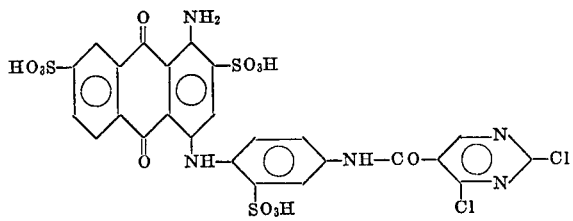

56.9 parts of the sodium salt of 1-amino-4-(4'-aminophenylamino)-anthraquinone - 2,2',7-trisulfonic acid (obtained by sulfonation of 1 - amino - 4-(4'-aminophenylamino)-anthraquinone-2,7-disulfonic acid in 30% oleum) are dissolved in 1000 parts of water. At 0–5°, a solution of 22.2 parts of 2,4-dichloro-pyrimidine-5-carboxylic acid chloride in 100 parts of acetone is added dropwise and at the same time the pH of the reaction mixture is kept at 5.0–5.5 by the addition of sodium carbonate solution. On completion of the reaction, the new dyestuff of the above formula is precipitated by the addition of sodium chloride, filtered off, washed with sodium chloride solution and dried in vacuo at 40–50°. It dissolves in water with a blue color and dyes cotton, staple fiber, jute, ramie, hemp wool, silk and nylon by processes usual for reactive dyestuffs in blue shades which are wet fast.

By using instead of 56.9 parts of 1-amino-4-(4'-aminophenylamino)-anthraquinone-2,2',7-trisulfonic acid, equivalent amounts of the anthraquinone dyestuffs listed in Column 2 of the following table and otherwise following the procedure described in Example 101, dyestuffs having similar properties are obtained. The shade of cellulose dyeings attained with the end products is given in Column 3 of the table.

TABLE 6

| 1 Example No. | 2 | 3 |
|---|---|---|
| 102 | (anthraquinone structure) | Blue. |
| 103 | (anthraquinone structure) | Do. |
| 104 | (anthraquinone structure) | Do. |
| 105 | (anthraquinone structure) | Do. |
| 106 | (anthraquinone structure) | Do. |

By using in Example 101, instead of 22.2 parts of 2,4-dichloropyrimidine-5-carboxylic acid chloride, equimolar amounts of the pyrimidine-5-carboxylic acid halide, listed in column 3 of the following Table 6a and as starting dyestuffs those used in the examples listed in column 2 of the aforesaid table, dyestuffs having similar properties are obtained with the shades listed in column 4.

TABLE 6a

| 1 | 2 | 3 | 4 |
|---|---|---|---|
| Ex. No. | | | |
| 107 | 102 | 2,4-difluoro-pyrimidine-5-carboxylic acid fluoride. | Blue. |
| 108 | 103 | -----do----------------------------------- | Do. |
| 109 | 104 | -----do----------------------------------- | Do. |
| 110 | 105 | -----do----------------------------------- | Do. |
| 111 | 106 | -----do----------------------------------- | Do. |
| 112 | 102 | 2,4-dibromo-pyrimidine-5-carboxylic acid bromide. | Do. |
| 113 | 103 | -----do----------------------------------- | Do. |
| 114 | 104 | -----do----------------------------------- | Do. |
| 115 | 105 | -----do----------------------------------- | Do. |
| 116 | 106 | -----do----------------------------------- | Do. |
| 117 | 103 | 2-methylthio-4-chloro-pyrimidine-5-carboxylic acid chloride. | |
| 118 | 105 | 2-methylthio-4-chloro-pyrimidine-5-carboxylic acid chloride. | Do. |
| 119 | 106 | -----do----------------------------------- | Do. |
| 120 | 103 | 2-ethylthio-4-fluoropyrimidine-5-carboxylic acid fluoride. | Do. |
| 121 | 105 | -----do----------------------------------- | Do. |
| 122 | 106 | -----do----------------------------------- | Do. |

EXAMPLE 123

57.6 parts of copper phthalocyanine tetrasulfonic acid chloride are slurried in 500 parts of water and 300 parts of ice, 15 parts of m-aminoacetanilide are stirred in and the pH is adjusted to 7 by the addition of aqueous ammonia solution. The temperature is then slowly allowed On completion of the reaction, the new dyestuff is completely salted out, filtered off and dried in vacuo at 50–60°. It corresponds to the schematic formula

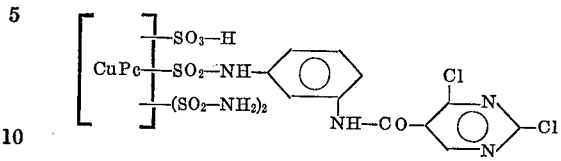

wherein Pc represents the phthalocyanine structure.

The dyestuff dyes cellulose or polyamide fibers in wet fast, pure turquoise blue shades.

By using, instead of 23.3 parts of 2,4-dichloropyrimidine-5-carboxylic acid chloride, equivalent amounts of the pyrimidine-5-carboxylic acid halides of the formula

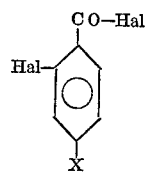

the substituents Hal and X of which are listed in columns 3 and 4 of the following Table 7, and reacting the same with the dyestuffs listed in column 2 of the said table, further dyestuffs having similar properties are obtained.

TABLE 7

| Ex. No. | Starting dyestuff | Substitution of pyrimidine-5-carboxylic acid halide | | Shade |
|---|---|---|---|---|
| | | Hal | X | |
| 124 | Cu Pc—SO₃H / —SO₂NH—⟨⟩—NH / —(SO₂NH₂)₂ | F | F | Turquoise blue. |
| 125 | | Br | Br | Do. |
| 126 | | Cl | SCH₃ | Do. |
| 127 | | Cl | SC₂H₅ | Do. |
| 128 | Cu Pc—(SO₃H)₃ / —SO₂NHCH₂CH₂NH₂ | F | F | Turquoise blue. |
| 129 | | Br | Br | Do. |
| 130 | | Cl | SCH₃ | Do. |
| 131 | | Cl | SC₂H₅ | Do. |
| 132 | | Cl | Cl | Do. |
| 133 | Cu Pc—(SO₂NH₂)₃ / —SO₂NH—⟨⟩—SO₃H (with NH₂) | Cl | Cl | Turquoise blue. |
| 134 | | F | F | Do. |
| 135 | | Br | Br | Do. |
| 136 | | Cl | SCH₃ | Do. |
| 137 | | Cl | SC₂H₅ | Do. | to rise to 40–50°, the pH of the suspension being maintained at 7.0–7.5 by the dropwise addition of ammonia solution. As soon as the condensation is finished, i.e. when no more primary amine can be traced, 270 parts of 30% hydrochloric acid are added and the mixture is stirred for 3 hours at 85–90°, to saponify the acetylamino group. The dyestuff is then isolated by filtration, again slurried in 1000 parts of 0–5° cold water and the pH of the suspension is adjusted to 8.0 with dilute sodium hydroxide solution. A solution of 23.3 parts of 2,4-dichloropyrimidine-5-carboxylic acid chloride in 100 parts of acetone is poured into this suspension. Condensation is performed while stirring well at 0–5° and the hydrochloric acid liberated is neutralized by the dropwise addition of dilute sodium carbonate solution.

EXAMPLE 138

46.3 parts of the dyestuff of the formula:

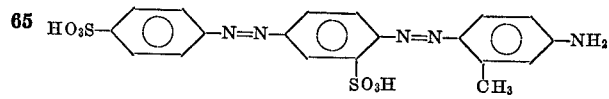

obtained by diazotizing 4-amino-3,4'-disulfo-azobenzene and coupling it in acid medium on 1-amino-3-methyl-benzene, are dissolved in 300 parts of water. A solution of 22.2 parts of 2,4-dichloropyrimidine-5-carboxylic acid chloride in 50 parts of acetone is slowly added at 0° to 5° C. and the pH of the reaction mixture maintained during the reaction and subsequent processing at 6.0–7.0 by the addition of an aqueous 15% sodium carbonate solution. As soon as the condensation is complete, the reactive dyestuff of the formula:

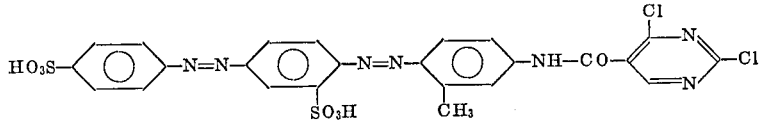

is precipitated by the addition of sodium chloride, separated by filtration and dried in vacuo at 40°–50°. It is an orange powder which dissolves in water with orange color. The dyestuff dyes cellulose fibers in fast orange shades.

Further disazo dyestuffs according to the invention which fall under the formula

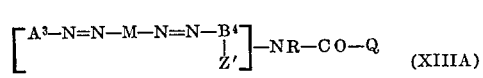 (XIIIA)

wherein Q represents a reactive grouping of the formula

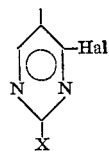

as defined above under Formula IA, R has the meaning given hereinbefore, $A^3$ represents (a) a benzene radical substituted with a combination of substituents selected from the following: hydrogen, lower alkyl, lower alkoxy, chlorine, fluorine, nitro, —$SO_3H$ and —COOH; or (b) sulfo-naphthyl-(1), sulfo-naphthyl-(2), or 1-hydroxy-disulfo-naphthyl-(2);

Z' is a substituent selected from the group consisting of hydrogen and hydroxy and being in o-position to the azo bridge at $B^4$;

M is a divalent radical of one of the formulas:

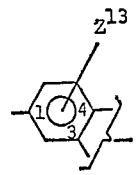

($Z^{13}$ being a member of the group consisting of hydrogen, hydroxy, lower alkyl, lower alkoxy, —$SO_3H$, —COOH and ureido),

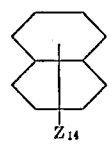

linked to the two azo bridges via two of its carbon atoms which are separated from each other by at least one other ring carbon atom ($Z^{14}$ being a member selected from the group consisting of hydrogen, hydroxy, lower alkoxy, —$SO_3H$ and —$NH_2$),

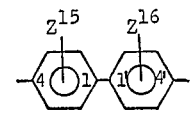

(each of $Z^{15}$ and $Z^{16}$ being a member selected from the group consisting of: hydrogen, hydroxy, lower alkyl, lower alkoxy, —COOH and $SO_3H$), and

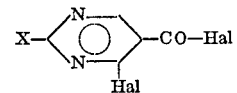

($Z^8$ and $Z^9$ having the meanings given hereinbefore), and the 1:1 copper complexes, the 2:1-chromium complexes and the 2:1-cobalt complexes of those of the above dyestuffs of Formula XIIIA in which each of M and $B^4$ is substituted with a hydroxyl group in ortho-position to the azo bridge between these moieties, the reactive grouping —NR—CO—Q being linked to a carbon atom of a six-membered ring of one of the moieties $A^3$ and $B^4$ which carbon atom is separated by at least two other ring carbon atoms from the next-adjacent azo bridge, are obtained by reacting correspondingly substituted pyrimidine-5-carboxylic acid halides of the formula $$X-\underset{\underset{Hal}{|}}{\overset{N}{\underset{N}{\bigcirc}}}-CO-Hal$$

with disazodyestuffs bearing a —NHR group in which:
R is hydrogen unless stated expressly otherwise in column 6 of the table below, at the position at the dyestuff moiety indicated in the same column, in accordance with the procedure given in Example 138, supra; the structural elements $A^3$, M and $B^4$ of the dyestuffs thus obtained are given in columns 2, 3 and 4 of the following table, the position of the above reactive grouping at the moieties $A^3$ or $B^4$, respectively, and the substituents Hal and X of the reactive grouping are shown in columns 6, 7 and 8, respectively, and the shade of dyeings obtained with the respective dyestuff on cellulosic materials is given in column 9 and the substituent Z' is shown in column 5.

The numeral in parentheses at the end of moieties $A^3$ and $B^4$ gives the position of the azo bridge linked thereto, respectively; in the case of moieties M, the first numeral in parentheses gives the position of the azo bridge to $A^3$ and the last numeral in parentheses gives the position of the azo bridge to $B^4$.

The starting disazodyestuffs are produced by well-known diazotizing and coupling methods from corresponding monoazo dyestuffs or the starting materials for the latter, all of which are known.

TABLE 8

| Ex. No. | 1 | 2 | 3 | 4 | 5 | 6 | 7 | 8 | 9 |
|---|---|---|---|---|---|---|---|---|---|
| 139 | 4-sulfophenyl-(1) | (1)-2,5-dimethoxy-phenylene-(4) | 3,6-disulfonaphthylene-(2) | OH | 8-B⁴ | | Br | Br | Blue. |
| 140 | 4,6,8-trisulfonaphthyl-(2) | (1)-2-methylphenylene-(4) | Phenylene-(1) | H | 4-B⁴ | | Cl | Cl | Orange. |
| 141 | 4-sulfophenylene-(1) | (1)-3,5-dihydroxyphenylene-(4) | 2-sulfo-4-chlorophenyl-(1) | OH | 3-A³ | | Cl | SCH₃ | Brown. |
| 142 | 2,4-disulfophenyl-(1) | (1)-naphthylene-(4) | 2-methyl-phenylene-(1) | H | 4-B⁴ | | F | F | Do. |
| 143 | 2-sulfo-4-chlorophenyl-(1) | (1)-7-sulfonaphthylene-(4) | 2-methoxyphenylene-(1) | H | 4-B⁴ | | F | SC₂H₅ | Do. |
| 144 | 2-sulfo-4-fluorophenyl-(1) | (1)-7-sulfonaphthylene-(4) | 2-acetylaminophenylene-(1) | H | 4-B⁴ | | Br | SCH₃ | Do. |
| 145 | 2-sulfo-4-methoxyphenyl(1) | (1)-7-sulfonaphthylene-(4) | 2-benzoylaminophenylene-(1) | H | 4-B⁴ | | Cl | Cl | Do. |
| 146 | 2-methylphenylene-(1) | (4)-3'-sulfobenzoyl-N-phenyl-anilid-(4'). | 1-[2,5'-disulfophenyl-(1')]-3-methylpyrazole-(4). | OH | 4-A³ | | Cl | Cl | Yellow. |
| 147 | 2-sulfo-4-methylphenyl-(1) | (1)-6-sulfonaphthylene-(4) | 2-ureidophenylene-(1) | H | 4-B⁴ | | Cl | Cl | Brown. |
| 148 | 3-nitro-6-sulfophenyl-(1) | (1)-3-methoxy-7-sulfonaphthyl-ene-(4). | 3,6-disulfonaphthylene | OH | 8-B⁴ | | Cl | Cl | Blue. |
| 149 | Phenylene-(1) | (1)-3-sulfophenylene-(4) | 3,6-disulfo-8-acetylamino-naphthyl-(2). | OH | 4-A³ | | Cl | SCH₃ | Red. |
| 150 | 3-carboxyphenyl-(1) | (1)-2-ureidophenylene-(4) | 3,5-disulfonaphthylene-(2) | OH | 8-B⁴ | | Br | Br | Blueish-red. |
| 151 | 2,4-disulfophenyl-(1) | (2)-1-amino-8-hydroxy-3,6-disulfonaphthylene-(7). | 6-sulfophenylene-(1) | H | 3-B⁴ | | Cl | Cl | Blue-black. |
| 152 | 6-sulfophenylene-(1) | (2)-1-hydroxy-8-amino-3,6-disulfonaphthylene-(7). | 6-sulfo-3-benzoylaminophenyl-(1). | H | 3-A³ | | F | F | Do. |
| 153 | 2-methylphenylene-(1) | (1)-4-sulfophenylene-(3) | 1-[2',5'-disulfophenyl-(1')]-3-methylpyrazole-(4). | OH | 4-A³ | | Cl | Cl | Yellow. |
| 154 | 2,5-disulfophenyl-(1) | (1)-7-sulfonaphthylene-(4) | Phenylene-(1) | H | 4-B⁴ | | Cl | Cl | Orange. |
| 155 | 6-sulfophenylene-(1) | (1)-6-sulfonaphthylene-(4) | 3,6-disulfo-8-benzoylamino-naphthyl-(2). | OH | 3-A³ | | Cl | Cl | Red. |
| 156 | 2,4-disulfophenyl-(1) | (1)-2-methoxy-5-hydroxy-phenylene-(4). | 3,6-disulfonaphthylene-(2) | OH | 8-B⁴ | | Cl | Cl | Reddish-blue. |
| 157 | 3,6,8-trisulfonaphthyl-(1) | (1)-phenylene-(4) | Phenylene-(1) | H | 4-B⁴ | | Cl | Cl | Yellow. |
| 158 | 4,6,8-trisulfonaphthyl-(2) | do | do | H | 4-B⁴ | | Cl | Cl | Do. |
| 159 | 2-methylphenylene-(1) | (4)-3,3'-dimethyl-6,6'-disulfo-1,1'-diphenylene-(4'). | 4-sulfonaphthyl-(2) | OH | 4-A³ | | Cl | Cl | Scarlet. |
| 160 | 1-hydroxy-3,6-disulfonaphthyl-(2). | (1)-2,5-dicarboxyphenylene-(4) | 3,6-disulfonaphthylene-(2) | OH {7-B⁴ R=CH₃} | | }F | SCH₃ | Green-blue. |
| 161 | 2-methylphenylene-(1) | (4)-1,1'-diphenylene-(4') | 3,6,8-trisulfonaphthyl-(2) | OH | 4-A³ | | Br | SC₂H₅ | Red. |
| 162 | 2-methylphenylene-(1) | (4)-3,3'-dicarboxy-1,1'-di-phenylene-(4'). | 3,6-disulfonaphthyl-(2) | OH | 4-A³ | | Cl | Cl | Violet. |
| 163 | 2-methylphenylene-(1) | (1)-4-sulfophenylene-(3) | 1-[2'-5'-dichlorophenyl-(1)]-3-carboxypyrazole-(4). | OH | 4-A³ | | Cl | SCH₃ | Yellow. |

EXAMPLE 164

87.6 parts of the dyestuff of the formula:

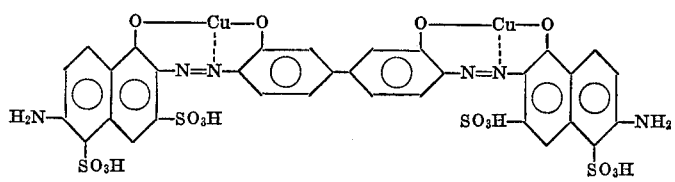

obtained by tetrazotizing one mole 4,4'-diamino-3,3'-dihydroxy-1,1'-diphenyl and coupling with 2 moles of 5-hydroxy-2-amino-1,7-disulfo-naphthalene, in accordance with Example 33 of German Patent 1,156,916, are dissolved in 600 parts of water. A solution of 44.4 parts of 2,4-dichloropyrimidine-5-carboxylic acid chloride in 100 parts of acetone is slowly added at 0°–5° and the pH of the mixture is maintained throughout at 6.0–7.0 by the addition of aqueous 15%-sodium carbonate solution. As soon as the condensation is complete, the reactive dyestuff of the formula:

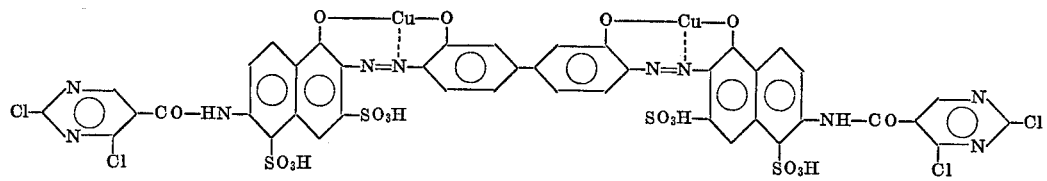

is precipitated by the addition of sodium chloride, separated by filtration and dried in vacuo at 40°–50°. The reactive dyestuff dissolves in water with blue color and dyes cellulose fibers in fast blue shades.

By using instead of the starting dyestuff of the above Example 164 the unmetallized dyestuff of Examples 141, 156 and 160, respectively, and otherwise following the procedure of Example 164, there are obtained the copper 1:1 complexes of these dyestuffs which dye cotton in fast brown, navy blue and greenish blue shades, respectively.

EXAMPLE 165

23.2 parts of 1-hydrazino-2-carboxybenzene-4-sulfonic acid (Na salt) are dissolved in 100 parts of water, and 10.6 parts of benzaldehyde are added. After completion of the condensation, which takes place at room temperature, 24.6 parts of diazotized 1-amino-2-hydroxy-3-acetylamino-benzene-5-sulfonic acid are added at 20–25°. A solution of 25.0 parts of crystallized CuSO₄ in 100 parts of water is added dropwise, and the pH of the reaction mixture is maintained at 5.0°–6.0 by simultaneous addition of aqueous 15%-sodium hydroxide solution. After completion of the formation of the dyestuff the acetylamino group is hydrolyzed by treatment with aqueous 7%-sodium hydroxide solution for 6 hours at 95–98°. The dyestuff of the formula

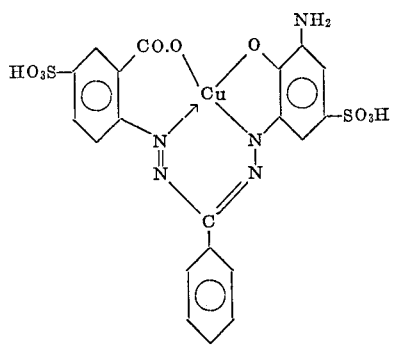

is salted out with sodium chloride, filtered, and dissolved in 600 parts of water at 20–25° C. At this temperature, 22.2 parts of 2,4-dichloropyrimidine-5-carboxylic acid chloride diluted with 50 parts of benzene are added dropwise within one hour. The pH of the reaction mixture is being maintained at 6.5–7.0 by addition of aqueous 15%-sodium carbonate solution. As soon as the condensation is complete, the dyestuff of the formula

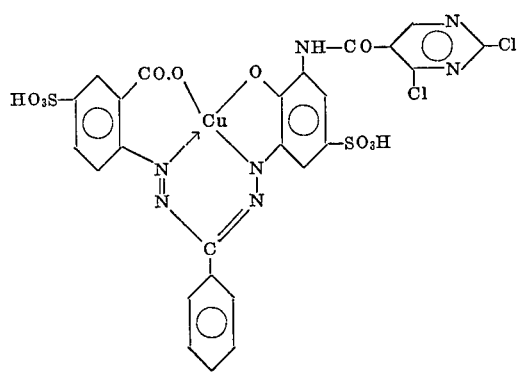

is salted out, filtered, and dried in vacuo at 20–25°. It is obtained as a black powder which dissolves in water with a blue color. It dyes cellulose fibers in pure, fast blue shades.

Similar formazane dyestuffs falling under formula

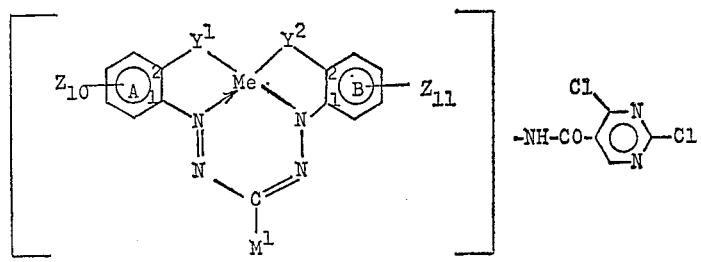

are obtained by reacting equimolar amounts of correspondingly substituted formazane dyestuffs with 2,4-dichloro-pyrimidine-5-carboxylic acid chloride in accordance with the procedure given in Example 165 supra; the structural elements $Z^{10}$, $Z^{11}$, $M^1$, $Y^1$ and Me of the dyestuffs thus obtained are given in columns 2, 3, and 5 through 8 of the following Table 9, the position of the above reactive grouping at the moiety to which it is attached as well as the latter is given in column 4 and the shade of dyeings obtained with the respective dyestuff on cellulosic materials is given in column 9 of Table 9 and the position of the reactive group is shown in column 4.

The carbon atom by which $M^1$ is attached to the remainder of the formazane molecule, is designated as 1-position of $M^1$.

TABLE 9

| Ex. No. | 2 | 3 | 4 | 5 | 6 | 7 | 8 | 9 |
|---|---|---|---|---|---|---|---|---|
| 166 | 4-sulfo | 5-sulfo | 3-B | 2-sulfophenyl- | —CO—O— | —O— | Cu | Blue. |
| 167 | do | do | 3-B | Methyl- | —CO—O— | —O— | Cu | Reddish blue. |
| 168 | do | do | 3-B | do | —CO—O— | —O | Mn | Ruby. |
| 169 | 5-sulfo | do | 3-B | do | —O— | —O— | Cu | Blue. |
| 170 | 4-sulfo | do | 3-B | Cyano- | —CO—O— | —O— | Cu | Violet. |
| 171 | 4-sulfamyl- | 3-sulfo | 5-B | do | —O— | —O— | Mn | Red. |
| 172 | 4-N,N-dimethyl sulfamyl- | 5-sulfo | 5-B | do | —O— | —O— | Cu | Violet. |
| 173 | 3,5-disulfo | do | 5-B | 2,4-disulfophenyl- | —O— | —O— | Cu | Blue. |
| 174 | 3-nitro-5-sulfo | do | 5-B | do | —O— | —O— | Cu | Do. |
| 175 | 3-chloro-5-sulfo | do | 3-B | do | —O— | —O— | Ni | Violet. |
| 176 | 5-carboxy- | do | 3-B | do | —CO—O— | —O— | Cu | Blue. |
| 177 | 5-methyl-3-sulfo | do | 3-B | 2-sulfo-phenyl- | —O— | —O— | Cu | Do. |
| 178 | 5-phenyl-3-sulfo | do | 3-B | 2,4-disulfophenyl- | —O— | —O— | Cu | Green. |
| 179 | 4-N-methylsulfamyl | do | 3-B | do | —O— | —O— | Cu | Blue. |
| 180 | 5-sulfo | 5-methyl-3-sulfo | 4-M [1] | Phenyl | —CO—O— | —O— | Cu | Do. |
| 181 | do | 5-sulfo | 3-B | Acetyl | —CO—O— | —O— | Cu | Violet. |
| 182 | 3,5-disulfo | 5-sulfo | 3-B | Phenyl | —O— | H | Co | Green. |
| 183 | 4-sulfo | do | 4-B | 2-sulfophenyl | —CO—O— | H | Cu | Ruby. |
| 184 | do | 3,5-disulfo | 4-A | Phenyl | —CO—O— | —O— | Cu | Blue. |
| 184a | do | 5-sulfo | 3-B | 2-chlorophenyl | —CO—O— | —O— | Cu | Do. |

By repeating the above examples but using instead of 2,4-dichloro-pyrimidine-5-carboxylic acid chloride an equimolar amount of one of the compounds given below, the corresponding dyestuffs falling under Formula XIV are obtained: 2,4-dibromo-pyrimidine-5-carboxylic acid bromide; 2,4-difluoro-pyrimidine-5-carboxylic acid fluoride; 2-methylthio-4-chloro-pyrimidine-5-carboxylic acid chloride; 2-butylthio-4-chloro-pyrimidine-5-carboxylic acid chloride.

These dyestuffs dye cellulosic fibers with the same shades as the corresponding 2,4-dichloro-pyrimidine-5-carbamyl-substituted dyestuffs of Examples 165–184, one or two halogen atoms of the reactive group being eliminated during reaction with the fiber molecules during dyeing, and a remaining halogen or alkylthio substituent at the reactive grouping having no noticeable influence on the shade of such dyeings.

EXAMPLE 185

77.3 parts of the dyestuff produced according to Example 123 are slurried in 1000 parts of water. A neutralized solution of 42.1 parts of the aminomonoazo dyestuff of the formula

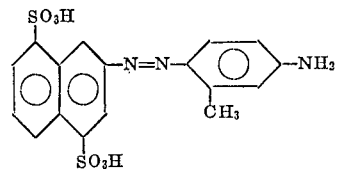

(obtained by coupling diazotized 2-aminonaphthalene-4,8-disulfonic acid with 1-amino-3-methylbenzene) in 400 parts of water is added and the whole is heated to 30–40°. The pH of the reaction mixture is kept at 6.5–7.5 by the addition of sodium carbonate solution. As soon as the condensation is complete, the dyestuff formed of the formula

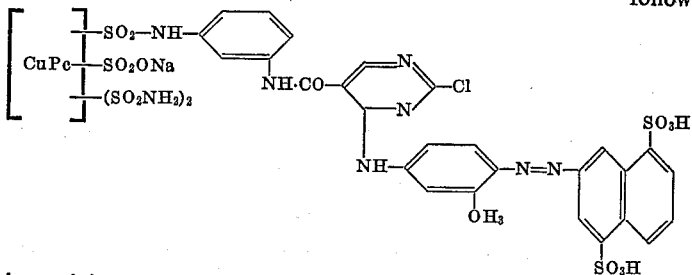

is precipitated by the addition of sodium chloride, filtered off and dried in vacuo at 60–70°. It is a green powder which dissolves in water with a green colour. The dyestuff dyes cellulose fibres by the dyeing processes usual for reactive dyestuffs in pure green shades which have very good wet and light fastness properties.

Dyestuffs having similar properties are obtained if, instead of the 77.3 parts of the dyestuff Example 123, equivalent amounts of the dyestuffs given in column 2 of the following table are reacted as described in Example 185 with equivalent amounts of the amino compounds given in column 3 at the pH values given in column 4 with the shade given in column 5.

| No. 1 | 2 | 3 | 4 | 5 |
|---|---|---|---|---|
| 186 | [structure: dichloropyrimidine-CO-NH-phenyl-SO₃H with azo to naphthol disulfonic acid] | NH₃ | 9–10 | Orange. |
| 187 | [structure: phenyl-SO₃H azo to naphthol with NH-CO-dichloropyrimidine, SO₃H groups] | H₂N-phenyl-SO₃H | 6–7 | Red. |
| 188 | [structure: anthraquinone with NH₂, SO₃H, NH-phenyl-SO₃H-NH-CO-dichloropyrimidine] | [naphthalene disulfonic acid azo to aniline-CH₃-NH₂] | 5–6 | Blue. |
| 189 | Same as 188 above | SO₃H-[anthraquinone with NH₂, SO₃H, NH-phenyl-SO₃H-NH₂] | 6–7 | Blue. |
| 190 | [structure: naphthalene-SO₃H azo to phenyl(OCH₃)(CH₃)-NH-CO-dichloropyrimidine] | [Cu Pc[-SO₂-NH-phenyl-NH₂; -(SO₃H)₂₋₃]] | 5–6 | Green. |
| 191 | Same as 190 above | CH₃-HN-phenyl-SO₃H | 5–6 | Yellow. |
| 192 | do | CH₃-HN-CH₂-CH₂-SO₃H | 8–9 | Do. |

EXAMPLE 193

The intermediate product produced according to Example 19 from 31.9 parts of 1-amino-8-hydroxynaphthalene-3,6-disulphonic acid and 22.2 parts of 2,4-dichloropyrimidine-5-carboxylic acid chloride, is dissolved in 200 parts of water. A neutralised solution of a further 31.9 parts of 1-amino-8-hydroxynaphthalene-3,6-disulphonic acid in 200 parts of water is added and the pH of the reaction mixture at room temperature is maintained at 4.5–5.5 with aqueous sodium carbonate solution. On completion of the condensation, 60 parts of sodium bicarbonate are added to the reaction solution and then a solution of 34.6 parts of diazotised 1-aminobenzene-2-sulphonic acid is poured in. The disazo dyestuff formed of the formula

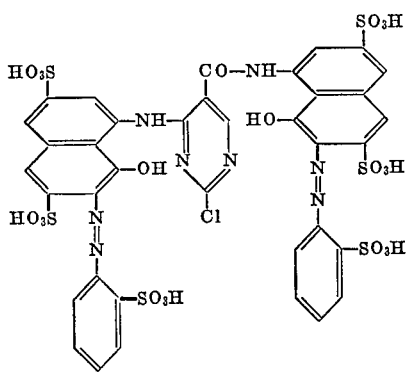

is precipitated by the addition of sodium chloride, filtered off and dried in vacuo at 70–80°. It dissolves easily in water with a red colour.

If cotton or staple fibre is dyed or printed by the usual processes for reactive dyestuffs, then red dyeings or prints are obtained which have very good wet and light fastness properties.

EXAMPLE 194

67.8 parts of the dyestuff corresponding to Example 48 are dissolved with a neutral reaction in 700 parts of water, 12.6 parts of sodium sulphite are added at room temperature and the whole is stirred until the pH remains stable. The newly formed dyestuff is salted out with sodium chloride, filtered off and dried in vacuo at 40–50°. It corresponds to the formula

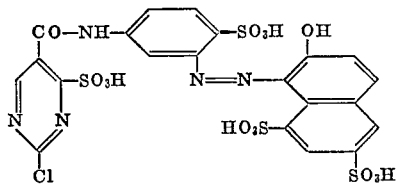

The dyestuff easily dissolves in water with an orange colour and dyes cotton by the processes usual for reactive dyestuffs in wet fast orange shades.

Dyestuffs having similar fastness properties but with slightly less reactivity, are obtained on using 17.7 parts of the sodium salt of 1-hydroxybenzene-4-sulphonic acid or 18.6 parts of the sodium salt of 1-mercapto-4-nitrobenzene instead of the 12.6 parts of sodium sulphite under the reaction conditions described in this example.

EXAMPLE 195

67.8 parts of the dyestuff corresponding to Example 48 are dissolved with a neutral reaction in 300 parts of water, 700 parts of methanol are added and the pH is adjusted to 9.5–10 by the addition of concentrated aqueous sodium carbonate solution. This pH value is maintained until completion of the reaction. The excess methanol is then distilled off in vacuo, the reaction mixture is diluted with 1000 parts of water, and the dyestuff is precipitated by the addition of potassium chloride. It is filtered off and dried in vacuo at 50–60°.

The new dyestuff corresponds to the formula

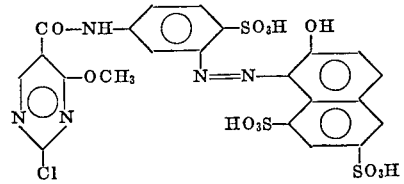

it dissolves easily in water with an orange color and dyes cotton or staple fiber by the processes usual for reactive dyestuffs in wet fast orange shades.

EXAMPLE 196

To 5 g. of dried, powdered, sulfur-free uracil-5-carboxylic acid were added 96 g. of phosphorus oxybromide and 5.2 ml. of mono-free N,N-diethylaniline. The mixture was protected from atmospheric moisture with a calcium chloride-filled drying tube and was refluxed for one hour after solution occurred. The resulting mixture was extracted with petroleum ether and the latter was removed from the extract by distillation in vacuo. The resulting 2,6-dibromopyrimidine-5-carboxylic acid bromide is usable directly in the examples given hereinbefore.

EXAMPLE 197

22.2 parts of 2,4-dichloro-pyrimidine-5-carboxylic acid are dissolved in 200 parts of dimethyl sulfone, 30 parts or potassium fluoride are added thereto and the mixture is heated for 12 hours at 150–155°.

The reaction product consisting essentially of a mixture of 2,4-difluoro-pyrimidine-5-carboxylic acid fluoride, dimethylsulfone, potassium chloride and residual potassium fluoride is usable directly in the examples given above which lead to the formation of dyestuffs according to the invention containing the reactive grouping

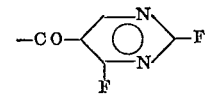

EXAMPLE 198

2-methylthio-4-chloro-pyrimidine-5-carboxylic acid chloride is prepared in strict accordance with the procedure described by H. C. Wheeler et al. in Am. Chem. Journal 40, page 237 et seq. (1908) for the production of 2-ethylthio-4-chloro-pyrimidine-5-carboxylic acid chloride, but using an equimolar amount of methyl isothiourea in lieu of ethylisothiourea used in the said publication.

In an analogous manner 2-isopropylthio- and 2-n-butylthio-4-chloro-pyrimidine-5-carboxyl acid chlorides are prepared.

EXAMPLE 199

Cotton or staple fibre is impregnated at 20–25° with a solution containing 20 parts of the dyestuff described in Example 48, 50 parts of Glauber's salt and 20 parts of calc. sodium carbonate. The goods are squeezed out to 80–100% liquor content, rolled up and stored for 4–24 hours at room temperature. After rinsing and soaping, a pure yellowish orange dyeing is obtained which has excellent fastness to washing and very good fastness to light.

EXAMPLE 200

100 parts of cotton is pad dyed in a foulard at 20° with a solution containing 2 parts of the dyestuff described in Example 1 and then dried. After drying it is again pad dyed with a solution containing 1 part of sodium hydroxide and 30 parts of sodium chloride in 100 parts of water and then steamed for 30 seconds at 100–103°. After rinsing and soaping at the boil, a very pure greenish yellow dyeing is obtained which is fast to boiling.

EXAMPLE 201

Cotton is introduced at 20–25° into a dye liquor (liquor ratio 1:40) containing 2% of the dyestuff described in Example 46 (calculated on the cotton). Sodium sulphate is added in portions within 30 minutes until the bath contains 50 parts thereof per litre. 10 parts per litre of calc. sodium carbonate are added within another hour and the temperature is raised at the same time to 35°. On completion of the dyeing, the cotton is rinsed and soaped at the boil. A level, reddish yellow dyeing is obtained which has very good wet fastness properties.

EXAMPLE 202

100 parts of polyamide fibres are boiled for 1 hour in a dyebath containing 2 parts of the monoazo dyestuff obtained according to Example 40 and 2 parts of formic acid in 3000 parts of water. After rinsing, a blueish red dyeing is obtained which has excellent wet and light fastness properties.

EXAMPLE 203

2 parts of the dyestuff obtained according to Example 40 are dissolved at 40° in 5000 parts of water and then 0.5 parts of a condensation product of ethylene oxide and stearyl amine and also 6 parts of 30% acetic acid are added. 100 parts of wool are entered into the bath so prepared, the bath is brought to the boil within 30 minutes, and dyeing is performed for 1 hour at this temperature. After rinsing, a blueish red dyeing is obtained which has good fastness to light, rubbing and washing.

We claim:

1. A fiber-reactive dyestuff of the formula

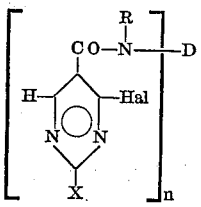

wherein D is a dyestuff-chromophoric radical selected from the class consisting of azo, anthraquinone and phthalocyanine dyestuff-chromophoric radicals, and wherein the nitrogen atom of the carbamyl group is attached to said chromophoric radical by a direct bond or through—lower alkylene-$NHSO_2$—to an aryl carbon atom thereof, R is a member selected from the group consisting of hydrogen and lower alkyl, $n$ is an integer ranging from 1 to 2, Hal represents fluorine, chlorine or bromine, and X is a member selected from the group consisting of lower alkylthio and halogen of the same atom number as the halogen atom represented by Hal.

2. A fiber-reactive dyestuff of the formula

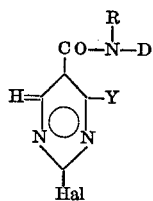

wherein D is a dyestuff-chromophoric radical selected from the class consisting of azo, anthraquinone and phthalocyanine dyestuff-chromophoric radicals, and wherein the nitrogen atom of the carbamyl group is attached to said chromophoric radical by a direct bond to an aryl carbon atom thereof, R is a member selected from the group consisting of hydrogen and lower alkyl, Hal represents fluorine, chlorine or bromine, and Y is a member selected from the group consisting of —$SO_3H$, —$NH_2$, —$OR^3$, —$SR^3$, —$NHR^3$ and

$R_3$ being a member selected from the group consisting of lower alkyl, ω-hydroxy-alkyl, ω-alkoxy-alkyl, ω-sulfo-alkyl, "alkyl" in each of the latter three members being of from 2 to 4 carbon atoms, ω-carboxy-lower alkyl, phenyl, sulfophenyl, carboxyphenyl, and $R_4$ being a member selected from the group consisting of lower alkyl, ω-carboxy-lower alkyl, ω-hydroxy alkyl, ω-alkoxy-alkyl and ω-sulfoalkyl, "alkyl" in the last three members being of from 2 to 4 carbon atoms.

3. A fiber-reactive dyestuff of the formula

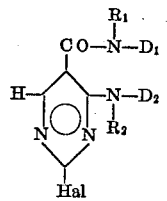

wherein each of $D_1$ and $D_2$ is a dyestuff-chromophoric radical selected from the class consisting of azo, anthraquinone and phthalocyanine dyestuff-chromophoric radicals, the nitrogen atoms, of the carbamyl group and of the —$NR_2$— group, respectively, in the above formula each being attached to the respective one of said chromophores $D_1$ and $D_2$ by a direct bond to an aryl carbon atom thereof, each of $R_1$ and $R_2$ is a member selected from the group consisting of hydrogen and a lower alkyl radical, and Hal represents fluorine, chlorine or bromine.

4. Fiber-reactive dye of the formula

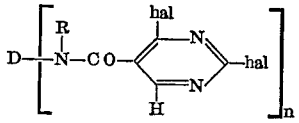

wherein D is the radical of an azo, anthraquinone or phthalocyanine dye wherein the nitrogen atom of the aminocarbonyl group is attached to the dye radical by a direct bond to an aryl carbon thereof, R is hydrogen or methyl, hal is chlorine or bromine, and $n$ is the integer 1 or 2.

5. A dyestuff, the free acid form of which is of the formula

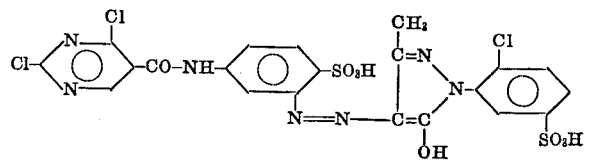

6. A dyestuff, the free acid form of which is of the formula

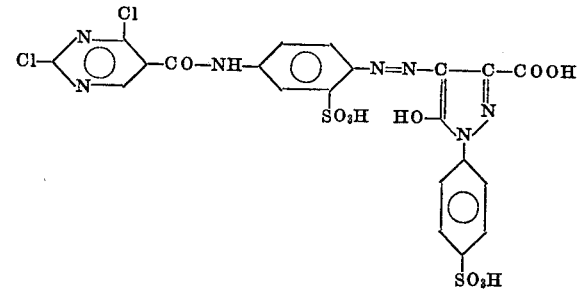

7. A dyestuff, the free acid form of which is of the formula

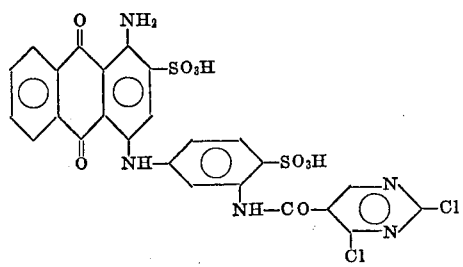

8. A dyestuff, the free acid form of which is of the formula

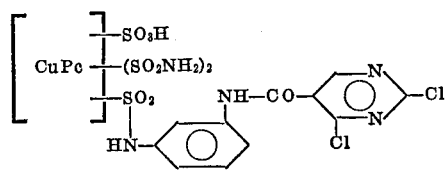

wherein CuPc represents the copper phthalocyanine radical.

9. A dyestuff which in its free acid form is of the formula

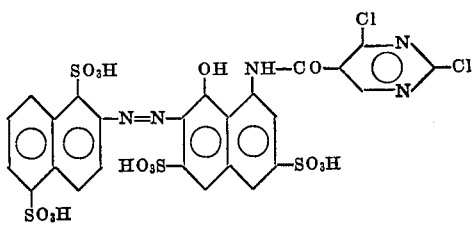

10. A dyestuff which in its free acid form, is of the formula

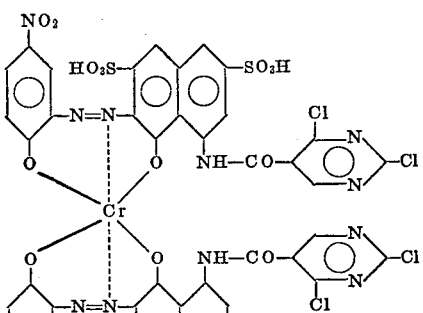

11. A dyestuff the free acid form of which is of the formula

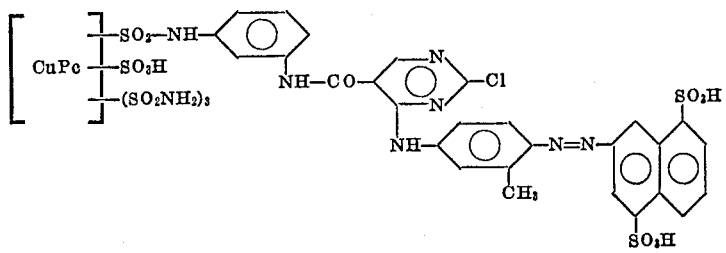

wherein CuPc represents the copper phthalocyanine radical.

References Cited

FOREIGN PATENTS

| | | |
|---|---|---|
| 221,678 | 6/1962 | Austria. |
| 94,954 | 12/1962 | Denmark. |
| 1,247,660 | 10/1960 | France. |
| 1,266,733 | 5/1961 | France. |
| 903,048 | 8/1962 | Great Britain. |

FLOYD D. HIGEL, Primary Examiner.

U.S. Cl. X.R.

8—41, 42, 50, 51, 63, 71; 260—154, 251, 261, 242, 239, 256.4, 145